United States Patent
Wu et al.

(10) Patent No.: US 11,101,855 B2
(45) Date of Patent: Aug. 24, 2021

(54) DATA SENDING METHOD, DATA RECEIVING METHOD, NETWORK DEVICE, AND TERMINAL DEVICE

(71) Applicant: HUAWEI TECHNOLOGIES CO., LTD., Guangdong (CN)

(72) Inventors: Ye Wu, Shanghai (CN); Xiaoyan Bi, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 55 days.

(21) Appl. No.: 16/664,444

(22) Filed: Oct. 25, 2019

(65) Prior Publication Data

US 2020/0059278 A1 Feb. 20, 2020

Related U.S. Application Data

(63) Continuation of application No. PCT/CN2018/082334, filed on Apr. 9, 2018.

(30) Foreign Application Priority Data

Apr. 26, 2017 (CN) .......................... 201710282820.8

(51) Int. Cl.
*H04B 7/04* (2017.01)
*H04B 7/0456* (2017.01)
*H04L 5/00* (2006.01)

(52) U.S. Cl.
CPC ......... *H04B 7/0482* (2013.01); *H04L 5/0026* (2013.01)

(58) Field of Classification Search
CPC ........................... H04B 7/0482; H04L 5/0026
See application file for complete search history.

(56) References Cited

U.S. PATENT DOCUMENTS

| 9,596,017 | B1* | 3/2017 | Mayrench | ............. H04W 72/04 |
| 2011/0149765 | A1* | 6/2011 | Gorokhov | ............. H04L 1/0026 370/252 |

(Continued)

FOREIGN PATENT DOCUMENTS

| CN | 101378299 A | 3/2009 |
| CN | 103780528 A | 5/2014 |

(Continued)

OTHER PUBLICATIONS

Samsung: "Simulation results for precoder cycling based on semi-open-loop transmission",3GPP Draft; R1-1612420,Nov. 13, 2016,XP051176368,total 6 pages.

(Continued)

*Primary Examiner* — Freshteh N Aghdam
(74) *Attorney, Agent, or Firm* — Womble Bond Dickinson (US) LLP

(57) ABSTRACT

This application provides a data sending method, a data receiving method, a network device, and a terminal device, to obtain a diversity gain to a greater extent, improve received signal quality, and improve data transmission reliability. The method includes: performing, by a network device, transmit diversity preprocessing on one modulated symbol stream to obtain at least one transmit diversity spatial stream; performing, by the network device, precoder cycling on the at least one transmit diversity spatial stream to obtain at least one precoded data stream, where each of the at least one transmit diversity spatial stream corresponds to at least two different precoding vectors; and sending, by the network device, the at least one precoded data stream to a first terminal device.

20 Claims, 10 Drawing Sheets

(56) References Cited

U.S. PATENT DOCUMENTS

| | | | |
|---|---|---|---|
| 2011/0149942 A1* | 6/2011 | Ko | H04B 7/0617 |
| | | | 370/343 |
| 2011/0280342 A1* | 11/2011 | Kim | H04L 25/03343 |
| | | | 375/316 |
| 2013/0064196 A1 | 3/2013 | Gao et al. | |
| 2014/0254517 A1* | 9/2014 | Nam | H04B 7/0452 |
| | | | 370/329 |
| 2015/0358061 A1* | 12/2015 | Zhang | H04B 7/0482 |
| | | | 370/329 |
| 2016/0087829 A1* | 3/2016 | Jia | H04L 27/2623 |
| | | | 375/267 |
| 2019/0296819 A1* | 9/2019 | Jiang | H04B 7/0456 |
| 2020/0162139 A1* | 5/2020 | Nammi | H04B 7/0456 |

FOREIGN PATENT DOCUMENTS

| | | |
|---|---|---|
| EP | 2684328 B1 | 6/2016 |
| WO | 2013040741 A1 | 3/2013 |
| WO | 2017003963 A1 | 1/2017 |

OTHER PUBLICATIONS

Samsung: "Discussion on the Spatial Diversity Transmission Schema for ePDCCH",3GPP Draft; R1-122250,May 12, 2012,XP050600514,total 4 pages.

\* cited by examiner

DATA SENDING METHOD, DATA RECEIVING METHOD, NETWORK DEVICE, AND TERMINAL DEVICE

CROSS-REFERENCE TO RELATED APPLICATIONS

This application is a continuation of International Application No. PCT/CN2018/082334, filed on Apr. 9, 2018, which claims priority to Chinese Patent Application No. 201710282820.8, filed on Apr. 26, 2017. The disclosures of the aforementioned applications are hereby incorporated by reference in their entireties.

TECHNICAL FIELD

This application relates to the communications field, and more specifically, to a data sending method, a data receiving method, a network device, and a terminal device.

BACKGROUND

In a long term evolution (LTE) system and an LTE advanced (LTE-A) system, a multiple-antenna technology is increasingly used for data transmission. A multiple-input multiple-output (MIMO) technology indicates that a transmit end device uses a plurality of transmit antennas to transmit signals and a receive end device uses a plurality of receive antennas to receive signals.

A MIMO system usually uses a precoding technology to improve a channel. However, when channel state information (CSI) cannot be obtained because a channel environment rapidly changes or the like, a relatively accurate precoding matrix cannot be obtained. Consequently, a to-be-transmitted signal obtained through precoding processing cannot accurately adapt to a current channel, and received signal quality is reduced.

Therefore, it is desirable to provide a transmission scheme to improve received signal quality and improve data transmission reliability.

SUMMARY

This application provides a data sending method, a data receiving method, a network device, and a terminal device, to obtain a diversity gain to a greater extent, improve received signal quality, and improve data transmission reliability.

According to a first aspect, a data sending method is provided, including:

performing, by a network device, transmit diversity preprocessing on one modulated symbol stream to obtain at least one transmit diversity spatial stream;

performing, by the network device, precoder cycling on the at least one transmit diversity spatial stream to obtain at least one precoded data stream, where each of the at least one transmit diversity spatial stream corresponds to at least two different precoding vectors; and sending, by the network device, the at least one precoded data stream to a first terminal device.

In this application, the foregoing transmission scheme may be referred to as precoder cycling based transmit diversity. However, it should be understood that the name is defined for ease of description and differentiation from another transmission scheme, and should not constitute any limitation on this application. This application does not exclude a possibility of defining the transmission scheme by using another name or replacing the name with another name in a future protocol.

It should be noted herein that each of the at least one transmit diversity spatial stream corresponds to the at least two different precoding vectors. In other words, the network device precodes each of the at least one transmit diversity spatial stream by using the at least two different precoding vectors. For brevity, descriptions of same or similar cases are omitted below.

Therefore, transmit diversity preprocessing is performed before precoding, so that at least a spatial diversity gain can be obtained by performing spatial transmit diversity on an original modulated symbol stream. In addition, precoder cycling is performed on a spatial stream obtained after transmit diversity preprocessing, so that different precoding vectors are used for a same transmit diversity spatial stream. When a channel environment changes or a channel is inaccurately estimated, different precoding vectors may be used on different time-frequency resources for channel matching, and at least a time-domain diversity gain or a frequency-domain diversity gain may be obtained. Therefore, this helps obtain transmit diversity gains in a plurality of dimensions, improves received signal quality, and improves data transmission reliability, so that robustness of a communications system can be improved.

In one embodiment, the performing, by a network device, transmit diversity preprocessing on one modulated symbol stream to obtain at least one transmit diversity spatial stream includes:

performing, by the network device, layer mapping on the modulated symbol stream to obtain at least one layer-mapping spatial layer; and performing, by the network device, a transmit diversity operation on the at least one layer-mapping spatial layer to obtain the at least one transmit diversity spatial stream.

In one embodiment, the precoder cycling includes time-frequency resource block based precoder cycling, each of the at least one transmit diversity spatial stream corresponds to one precoding vector on one time-frequency resource block, and each transmit diversity spatial stream corresponds to different precoding vectors on any two consecutive time-frequency resource blocks.

The performing, by the network device, precoder cycling on the at least one transmit diversity spatial stream to obtain at least one precoded data stream includes:

performing, by the network device, time-frequency resource block based precoding on each of the at least one transmit diversity spatial stream based on a precoding vector corresponding to the transmit diversity spatial stream on each time-frequency resource block, to obtain the at least one precoded data stream.

Therefore, it is relatively simple to perform a time-frequency resource block based precoder cycling operation, and the at least one transmit diversity spatial stream may be precoded based on each time-frequency resource block by using a corresponding precoding matrix.

Specifically, each of the at least one transmit diversity spatial stream corresponds to one demodulation reference signal DMRS port on one time-frequency resource block, each DMRS port corresponds to one precoding vector, and each DMRS port corresponds to different precoding vectors on any two consecutive time-frequency resource blocks.

Assuming that a quantity of the at least one transmit diversity spatial stream is x (x≥1, and x is a natural number), in other words, assuming that there are x transmit diversity spatial streams, the x transmit diversity spatial streams correspond to x DMRS ports on one time-frequency resource block, and correspond to x precoding vectors; or the x transmit diversity spatial streams correspond to one precoding matrix, and the precoding matrix is obtained by combining x precoding vectors.

In other words, the network device performs time-frequency resource block based precoding on each of the at least one transmit diversity spatial stream based on the precoding vector corresponding to the transmit diversity spatial stream on each time-frequency resource block. To be specific, the network device performs time-frequency resource block based precoding on the x transmit diversity spatial streams based on the precoding matrix corresponding to the x transmit diversity spatial streams on each time-frequency resource block, and the precoding matrix is obtained by combining the x precoding vectors.

It should be understood that the foregoing precoding matrix obtained by combining the x precoding vectors does not indicate that the precoding matrix is obtained by simply combining the x precoding vectors, but is obtained by combining the x precoding vectors according to a transmit diversity rule. It should be further understood that the precoding matrix obtained by combining the x precoding vectors is only one implementation, and should not constitute any limitation on this or other embodiment of the present invention. This application does not exclude a possibility that the precoding matrix includes another vector. For brevity, descriptions of same or similar cases are omitted below.

In one embodiment, the precoder cycling includes resource element (RE) based precoder cycling, and each of the at least one transmit diversity spatial stream corresponds to at least two precoding vectors on one time-frequency resource block.

The performing, by the network device, precoder cycling on the at least one transmit diversity spatial stream to obtain at least one precoded data stream includes:

performing, by the network device, RE based precoding on each of the at least one transmit diversity spatial stream based on at least two precoding vectors corresponding to the transmit diversity spatial stream on each time-frequency resource block, to obtain the at least one precoded data stream.

In other words, a precoder cycling granularity is further refined on one time-frequency resource block, so that the time-frequency resource block includes at least two REs corresponding to different precoding matrices.

Therefore, RE based precoder cycling indicates that the at least one transmit diversity spatial stream needs to be precoded for each RE, and a finer precoding granularity is more beneficial to achieve a maximum diversity gain.

In method 2 (further described below), a correspondence between a quantity of layer-mapping spatial layers and a quantity of DMRS ports may be defined as any one of the following:

Definition 1: A quantity of layer-mapping spatial layers may be different from a quantity of DMRS ports corresponding to the layer-mapping spatial layers.

It is assumed that a quantity of the at least one layer-mapping spatial layer is x (x≥1, and x is a natural number), and each layer-mapping spatial layer corresponds to y (y≥2, and y is a natural number) DMRS ports on one time-frequency resource block. In this case, the x layer-mapping spatial layers correspond to x×y DMRS ports on the time-frequency resource block, and correspond to x×y precoding vectors; or the x layer-mapping spatial layers correspond to y precoding matrices, and each precoding matrix is obtained by combining x precoding vectors. In other words, one layer corresponds to a plurality of DMRS ports, and each DMRS port corresponds to one precoding vector.

Definition 2: A quantity of layer-mapping spatial layers may be the same as a quantity of DMRS ports corresponding to the layer-mapping spatial layers.

It is assumed that a quantity z of the at least one layer-mapping spatial layer is x×y (x≥1, y≥2, and x, y, and z are all natural numbers), and each layer-mapping spatial layer corresponds to one DMRS port on one time-frequency resource block. In this case, the x×y layer-mapping spatial layers correspond to z DMRS ports on the time-frequency resource block, and correspond to z precoding vectors; or the x×y layer-mapping spatial layers correspond to y precoding matrices, and each precoding matrix is obtained by combining x precoding vectors. In other words, one layer corresponds to one DMRS port, and each DMRS port corresponds to one precoding vector.

Definition 3: A quantity of layer-mapping spatial layers may be the same as a quantity of DMRS ports corresponding to the layer-mapping spatial layers.

It is assumed that a quantity of the at least one layer-mapping spatial layer is x (x≥1, and x is a natural number), each layer-mapping spatial layer corresponds to one DMRS port on one time-frequency resource block, the x layer-mapping spatial layers correspond to x DMRS ports, and each DMRS port corresponds to y (y≥2, and y is a natural number) precoding vectors. In this case, the x layer-mapping spatial layers correspond to x×y precoding vectors; or the x layer-mapping spatial layers correspond to y precoding matrices, and each precoding matrix is obtained by combining x precoding vectors. In other words, one layer corresponds to one DMRS port, and one DMRS port corresponds to a plurality of precoding vectors.

In definition 1 and definition 2, each of the at least one transmit diversity spatial stream corresponds to at least two DMRS ports on one time-frequency resource block, and each DMRS port corresponds to one precoding vector. For a definition of the DMRS port, refer to a definition of a DMRS port in an existing protocol (for example, an LTE protocol).

In definition 3, each of the at least one transmit diversity spatial stream corresponds to one DMRS port on one RB, and each DMRS port corresponds to at least two precoding vectors.

The definition of the DMRS port is slightly different from that of a DMRS port in a current protocol. However, this application does not exclude a possibility of modifying or supplementing the definition of the DMRS port in a future protocol. In this design, one DMRS may be understood as a group of DMRS ports defined in the current protocol, and each group corresponds to at least two precoding vectors. In this case, for a definition of the layer, refer to a definition of a layer in an existing protocol (for example, an LTE protocol).

It should be noted that the foregoing process of mapping a layer-mapping spatial layer to a DMRS port may specifically include: mapping the layer-mapping spatial layer to a transmit diversity spatial stream, and then mapping the transmit diversity spatial stream to the DMRS port, where a quantity of transmit diversity spatial streams may be the same as a quantity of layer-mapping spatial layers.

In one embodiment, the at least one transmit diversity spatial stream is a spatial stream corresponding to the first terminal device in a plurality of spatial streams, and the plurality of spatial streams correspond to a plurality of terminal devices including the first terminal device.

In other words, the network device may transmit data to the plurality of terminal devices in a space division manner, and therefore multi-user multiple-input multiple-output (multiple-user multiple-input multiple-output, MU-MIMO) is implemented.

In one embodiment, transmission schemes for the plurality of spatial streams are the same.

In one embodiment, the plurality of spatial streams belong to at least two different transmission schemes. In one embodiment, the at least two transmission schemes include precoder cycling, transmit diversity, spatial multiplexing, or precoder cycling based transmit diversity.

Therefore, different transmission schemes may be used for data transmission with a plurality of terminal devices, thereby increasing a spatial degree of freedom. In addition, it is possible to flexibly use a proper transmission scheme based on different channel quality, data transmission reliability is improved, and robustness of a communications system is improved.

According to a second aspect, a data receiving method is provided, including:

receiving, by a first terminal device, at least one precoded data stream sent by a network device, where the at least one precoded data stream is obtained by the network device by performing precoder cycling on at least one transmit diversity spatial stream, the at least one transmit diversity spatial stream is obtained by performing transmit diversity preprocessing based on one modulated symbol stream, and each of the at least one transmit diversity spatial stream corresponds to at least two different precoding vectors; and demodulating, by the first terminal device, the at least one precoded data stream to obtain an estimated value of the modulated symbol stream.

Therefore, transmit diversity preprocessing is performed before precoding, so that at least a spatial diversity gain can be obtained by performing spatial transmit diversity on an original modulated symbol stream. In addition, precoder cycling is performed on a spatial stream obtained after transmit diversity preprocessing, so that different precoding vectors are used for a same transmit diversity spatial stream. When a channel environment changes or a channel is inaccurately estimated, different precoding vectors may be used on different time-frequency resources for channel matching, and at least a time-domain diversity gain or a frequency-domain diversity gain may be obtained. Therefore, this helps obtain transmit diversity gains in a plurality of dimensions, improves received signal quality, and improves data transmission reliability, so that robustness of a communications system can be improved.

In one embodiment, the demodulating, by the first terminal device, the at least one precoded data stream to obtain an estimated value of the modulated symbol stream includes:

obtaining, by the first terminal device, an estimated value of at least one layer-mapping spatial layer from the at least one precoded data stream through demodulation, where the estimated value of the at least one layer-mapping spatial layer corresponds to at least one layer-mapping spatial layer obtained by the network device by performing layer mapping on the modulated symbol stream; and performing, by the first terminal device, inverse layer mapping on the estimated value of the at least one layer-mapping spatial layer to obtain the estimated value of the modulated symbol stream.

In one embodiment, the precoder cycling includes time-frequency resource block based precoder cycling, each of the at least one transmit diversity spatial stream corresponds to one precoding vector on one time-frequency resource block, and each transmit diversity spatial stream corresponds to different precoding vectors on any two consecutive time-frequency resource blocks.

In one embodiment, the precoder cycling includes resource element (RE) based precoder cycling, and each of the at least one transmit diversity spatial stream corresponds to at least two precoding vectors on one time-frequency resource block.

According to a third aspect, a data sending method is provided, including:

performing, by a first terminal device, transmit diversity preprocessing on one modulated symbol stream to obtain at least one transmit diversity spatial stream;

performing, by the first terminal device, precoder cycling on the at least one transmit diversity spatial stream to obtain at least one precoded data stream, where each of the at least one transmit diversity spatial stream corresponds to at least two different precoding vectors; and sending, by the first terminal device, the at least one precoded data stream to a network device.

In this application, the foregoing transmission scheme may be referred to as precoder cycling based transmit diversity (precoder cycling based transmit diversity). However, it should be understood that the name is defined for ease of description and differentiation from another transmission scheme, and should not constitute any limitation on this application. This application does not exclude a possibility of defining the transmission scheme by using another name or replacing the name with another name in a future protocol.

Therefore, transmit diversity preprocessing is performed before precoding, so that at least a spatial diversity gain can be obtained by performing spatial transmit diversity on an original modulated symbol stream. In addition, precoder cycling is performed on a spatial stream obtained after transmit diversity preprocessing, so that different precoding vectors are used for a same transmit diversity spatial stream. When a channel environment changes or a channel is inaccurately estimated, different precoding vectors may be used on different time-frequency resources for channel matching, and at least a time-domain diversity gain or a frequency-domain diversity gain may be obtained. Therefore, this helps obtain transmit diversity gains in a plurality of dimensions, improves received signal quality, and improves data transmission reliability, so that robustness of a communications system can be improved.

In one embodiment, the performing, by a first terminal device, transmit diversity preprocessing on one modulated symbol stream to obtain at least one transmit diversity spatial stream includes:

performing, by the first terminal device, layer mapping on the modulated symbol stream to obtain at least one layer-mapping spatial layer; and performing, by the first terminal device, a transmit diversity operation on the at least one layer-mapping spatial layer to obtain the at least one transmit diversity spatial stream.

In one embodiment, the precoder cycling includes time-frequency resource block based precoder cycling, each of the at least one transmit diversity spatial stream corresponds to one precoding vector on one time-frequency resource block, and each transmit diversity spatial stream corresponds to different precoding vectors on any two consecutive time-frequency resource blocks.

The performing, by the first terminal device, precoder cycling on the at least one transmit diversity spatial stream to obtain at least one precoded data stream includes:

performing, by the first terminal device, time-frequency resource block based precoding on each of the at least one transmit diversity spatial stream based on a precoding vector corresponding to the transmit diversity spatial stream on each time-frequency resource block, to obtain the at least one precoded data stream.

Therefore, it is relatively simple to perform a time-frequency resource block based precoder cycling operation, and the at least one transmit diversity spatial stream may be precoded based on each time-frequency resource block by using a corresponding precoding matrix.

Specifically, each of the at least one transmit diversity spatial stream corresponds to one demodulation reference signal DMRS port on one time-frequency resource block, each DMRS port corresponds to one precoding vector, and each DMRS port corresponds to different precoding vectors on any two consecutive time-frequency resource blocks.

Assuming that a quantity of the at least one transmit diversity spatial stream is x (x≥1, and x is a natural number), in other words, assuming that there are x transmit diversity spatial streams, the x transmit diversity spatial streams correspond to x DMRS ports on one time-frequency resource block, and correspond to x precoding vectors; or the x transmit diversity spatial streams correspond to one precoding matrix, and the precoding matrix is obtained by combining x precoding vectors.

In other words, the first terminal device performs time-frequency resource block based precoding on each of the at least one transmit diversity spatial stream based on the precoding vector corresponding to the transmit diversity spatial stream on each time-frequency resource block. To be specific, the first terminal device performs time-frequency resource block based precoding on the x transmit diversity spatial streams based on the precoding matrix corresponding to the x transmit diversity spatial streams on each time-frequency resource block, and the precoding matrix is obtained by combining the x precoding vectors.

In one embodiment, the precoder cycling includes resource element (RE) based precoder cycling, and each of the at least one transmit diversity spatial stream corresponds to at least two precoding vectors on one time-frequency resource block.

The performing, by the first terminal device, precoder cycling on the at least one transmit diversity spatial stream to obtain at least one precoded data stream includes:

performing, by the first terminal device, RE based precoding on each of the at least one transmit diversity spatial stream based on at least two precoding vectors corresponding to the transmit diversity spatial stream on each time-frequency resource block, to obtain the at least one precoded data stream.

In other words, a precoder cycling granularity is further refined on one time-frequency resource block, so that the time-frequency resource block includes at least two REs corresponding to different precoding matrices.

Therefore, RE based precoder cycling indicates that the at least one transmit diversity spatial stream needs to be precoded for each RE, and a finer precoding granularity is more beneficial to achieve a maximum diversity gain.

In this precoder cycling method, the network device may perform RE based precoding on each of the at least one transmit diversity spatial stream based on the at least two precoding vectors corresponding to the transmit diversity spatial stream on each time-frequency resource block. To be specific, the network device performs RE based precoding on the x transmit diversity spatial streams based on y precoding matrices corresponding to the x transmit diversity spatial streams on each time-frequency resource block, and each precoding matrix is obtained by combining x precoding vectors.

Specifically, a correspondence between a quantity of layer-mapping spatial layers and a quantity of DMRS ports may be defined as any one of the following:

Definition 1: A quantity of layer-mapping spatial layers may be different from a quantity of DMRS ports corresponding to the layer-mapping spatial layers.

It is assumed that a quantity of the at least one layer-mapping spatial layer is x (x≥1, and x is a natural number), and each layer-mapping spatial layer corresponds to y (y≥2, and y is a natural number) DMRS ports on one time-frequency resource block. In this case, the x layer-mapping spatial layers correspond to x×y DMRS ports on the time-frequency resource block, and correspond to x×y precoding vectors; or the x layer-mapping spatial layers correspond to y precoding matrices, and each precoding matrix is obtained by combining x precoding vectors.

Definition 2: A quantity of layer-mapping spatial layers may be the same as a quantity of DMRS ports corresponding to the layer-mapping spatial layers.

It is assumed that a quantity z of the at least one layer-mapping spatial layer is x×y (x≥1, y≥2, and x, y, and z are all natural numbers), and each layer-mapping spatial layer corresponds to one DMRS port on one time-frequency resource block. In this case, the x×y layer-mapping spatial layers correspond to z DMRS ports on the time-frequency resource block, and correspond to z precoding vectors; or the x×y layer-mapping spatial layers correspond to y precoding matrices, and each precoding matrix is obtained by combining x precoding vectors.

Definition 3: A quantity of layer-mapping spatial layers may be the same as a quantity of DMRS ports corresponding to the layer-mapping spatial layers.

It is assumed that a quantity of the at least one layer-mapping spatial layer is x (x≥1, and x is a natural number), each layer-mapping spatial layer corresponds to one DMRS port on one time-frequency resource block, the x layer-mapping spatial layers correspond to x DMRS ports, and each DMRS port corresponds to y (y≥2, and y is a natural number) precoding vectors. In this case, the x layer-mapping spatial layers correspond to x×y precoding vectors; or the x layer-mapping spatial layers correspond to y precoding matrices, and each precoding matrix is obtained by combining x precoding vectors.

In definition 1 and definition 2, each of the at least one transmit diversity spatial stream corresponds to at least two DMRS ports on one time-frequency resource block, and each DMRS port corresponds to one precoding vector. For a definition of the DMRS port, refer to a definition of a DMRS port in an existing protocol (for example, an LTE protocol).

In definition 3, each of the at least one transmit diversity spatial stream corresponds to one DMRS port on one RB, and each DMRS port corresponds to at least two precoding vectors.

The definition of the DMRS port is slightly different from that of a DMRS port in a current protocol. However, this application does not exclude a possibility of modifying or supplementing the definition of the DMRS port in a future protocol. In this design, one DMRS may be understood as a group of DMRS ports defined in the current protocol, and each group corresponds to at least two precoding vectors. In this case, for a definition of the layer, refer to a definition of a layer in an existing protocol (for example, an LTE protocol).

It should be noted that the foregoing process of mapping a layer-mapping spatial layer to a DMRS port may specifically include: mapping the layer-mapping spatial layer to a transmit diversity spatial stream, and then mapping the transmit diversity spatial stream to the DMRS port, where a quantity of transmit diversity spatial streams may be the same as a quantity of layer-mapping spatial layers.

According to a fourth aspect, a data receiving method is provided, including:

receiving, by a network device, at least one precoded data stream sent by a first terminal device, where the at least one precoded data stream is obtained by the first terminal device by performing precoder cycling on at least one transmit diversity spatial stream, the at least one transmit diversity spatial stream is obtained by performing transmit diversity preprocessing based on one modulated symbol stream, and each of the at least one transmit diversity spatial stream corresponds to at least two different precoding vectors; and demodulating, by the network device, the at least one precoded data stream to obtain an estimated value of the modulated symbol stream.

Therefore, transmit diversity preprocessing is performed before precoding, so that at least a spatial diversity gain can be obtained by performing spatial transmit diversity on an original modulated symbol stream. In addition, precoder cycling is performed on a spatial stream obtained after transmit diversity preprocessing, so that different precoding vectors are used for a same transmit diversity spatial stream. When a channel environment changes or a channel is inaccurately estimated, different precoding vectors may be used on different time-frequency resources for channel matching, and at least a time-domain diversity gain or a frequency-domain diversity gain may be obtained. Therefore, this helps obtain transmit diversity gains in a plurality of dimensions, improves received signal quality, and improves data transmission reliability, so that robustness of a communications system can be improved.

In one embodiment, the recovering, by the network device, an estimated value of the modulated symbol stream from the at least one precoded data stream includes:

obtaining, by the network device, an estimated value of at least one layer-mapping spatial layer from the at least one precoded data stream through demodulation, where the estimated value of the at least one layer-mapping spatial layer corresponds to at least one layer-mapping spatial layer obtained by the network device by performing layer mapping on the modulated symbol stream; and performing, by the network device, inverse layer mapping on the estimated value of the at least one layer-mapping spatial layer to obtain the estimated value of the modulated symbol stream.

In one embodiment, the precoder cycling includes time-frequency resource block based precoder cycling, each of the at least one transmit diversity spatial stream corresponds to one precoding vector on one time-frequency resource block, and each transmit diversity spatial stream corresponds to different precoding vectors on any two consecutive time-frequency resource blocks.

In one embodiment, the precoder cycling includes resource element (RE) based precoder cycling, and each of the at least one transmit diversity spatial stream corresponds to at least two precoding vectors on one time-frequency resource block.

In one embodiment, the at least one transmit diversity spatial stream is a spatial stream corresponding to the first terminal device in a plurality of spatial streams, and the plurality of spatial streams correspond to a plurality of terminal devices including the first terminal device.

In one embodiment, transmission schemes for the plurality of spatial streams are the same.

In one embodiment, the plurality of spatial streams belong to at least two transmission schemes. In one embodiment, the at least two transmission schemes include precoder cycling, transmit diversity, spatial multiplexing, or precoder cycling based transmit diversity.

Therefore, different transmission schemes may be used for data transmission with a plurality of terminal devices, thereby increasing a spatial degree of freedom. In addition, it is possible to flexibly use a proper transmission scheme based on different channel quality, data transmission reliability is improved, and robustness of a communications system is improved.

According to a fifth aspect, a network device is provided, and the network device includes modules configured to perform the data sending method according to any one of the first aspect or the possible implementations of the first aspect.

According to a sixth aspect, a terminal device is provided, and the terminal device includes modules configured to perform the data receiving method according to any one of the second aspect or the possible implementations of the second aspect.

According to a seventh aspect, a terminal device is provided, and the terminal device includes modules configured to perform the data sending method according to any one of the third aspect or the possible implementations of the third aspect.

According to an eighth aspect, a network device is provided, and the network device includes modules configured to perform the data receiving method according to any one of the fourth aspect or the possible implementations of the fourth aspect.

According to a ninth aspect, a network device is provided, including a transceiver, a processor, and a memory. The processor is configured to control the transceiver to receive and send a signal, the memory is configured to store a computer program, and the processor is configured to invoke the computer program from the memory and run the computer program, so that the network device performs the method according to any one of the first aspect or the possible implementations of the first aspect, or the method according to any one of the fourth aspect or the possible implementations of the fourth aspect.

According to a tenth aspect, a terminal device is provided, including a transceiver, a processor, and a memory. The processor is configured to control the transceiver to receive and send a signal, the memory is configured to store a computer program, and the processor is configured to invoke the computer program from the memory and run the computer program, so that the terminal device performs the method according to any one of the second aspect or the possible implementations of the second aspect, or the method according to any one of the third aspect or the possible implementations of the third aspect.

According to an eleventh aspect, a computer program product is provided. The computer program product includes computer program code, and when the computer program code is run by a network device, the network device is enabled to perform the method according to any one of the first aspect or the possible implementations of the first aspect, or the method according to any one of the fourth aspect or the possible implementations of the fourth aspect.

According to a twelfth aspect, a computer program product is provided. The computer program product includes computer program code, and when the computer program code is run by a terminal device, the terminal device is enabled to perform the method according to any one of the second aspect or the possible implementations of the second aspect, or the method according to any one of the third aspect or the possible implementations of the third aspect.

According to a thirteenth aspect, a computer readable medium is provided. The computer readable medium stores program code, and the program code includes an instruction used to perform the methods according to any one of the first aspect to the fourth aspect, or the possible implementations of the first aspect to the possible implementations of the fourth aspect.

According to a fourteenth aspect, a processing apparatus is provided, including a processor and an interface. The processor is configured to perform the methods according to any one of the first aspect to the fourth aspect, or the possible implementations of the first aspect to the possible implementations of the fourth aspect, and related data exchange (for example, data transmission or reception) is completed through the interface. In a specific implementation process, the interface may further complete the foregoing data interaction process by using a transceiver.

It should be understood that the processing apparatus in the fourteenth aspect may be a chip. The processor may be implemented by using hardware, or may be implemented by using software. When the processor is implemented by using hardware, the processor may be a logic circuit, an integrated circuit, or the like; or when the processor is implemented by using software, the processor may be a general-purpose processor, and is implemented by reading software code stored in the memory. The memory may be integrated into the processor, or may exist independently outside the processor.

In one embodiment, one time-frequency resource block may include at least one of the following: a part of one resource element, one resource element, or a plurality of resource elements. The resource element may be understood as a minimum scheduling unit for physical layer transmission.

By way of example but not limitation, one resource element may be one resource block (resource block, RB). For a definition of the RB, refer to an existing protocol (for example, an LTE protocol).

In one embodiment, one time-frequency resource block may include at least one of the following: a part of one RB, one RB, or a plurality of RBs.

In one embodiment, the transmit diversity operations include diversity manners such as space time transmit diversity (space-time transmit diversity, STTD, or referred to as space time block code (STBC)), a space-frequency transmit diversity (SFTD, or referred to as space frequency block coding (SFBC)), a time switched transmit diversity (TSTD), frequency switched transmit diversity (FSTD), orthogonal transmit diversity (OTD), cyclic delay diversity (CDD), and layer shifting, and diversity manners obtained after derivation, evolution, and combination of the foregoing various diversity manners.

In this application, a precoder cycling based transmit diversity transmission scheme is used to help obtain a diversity gain to a greater extent, thereby improving received signal quality, improving data transmission reliability, and improving robustness of a communications system.

DESCRIPTION OF EMBODIMENTS

The following describes technical solutions of this application with reference to accompanying drawings.

Figure 1:
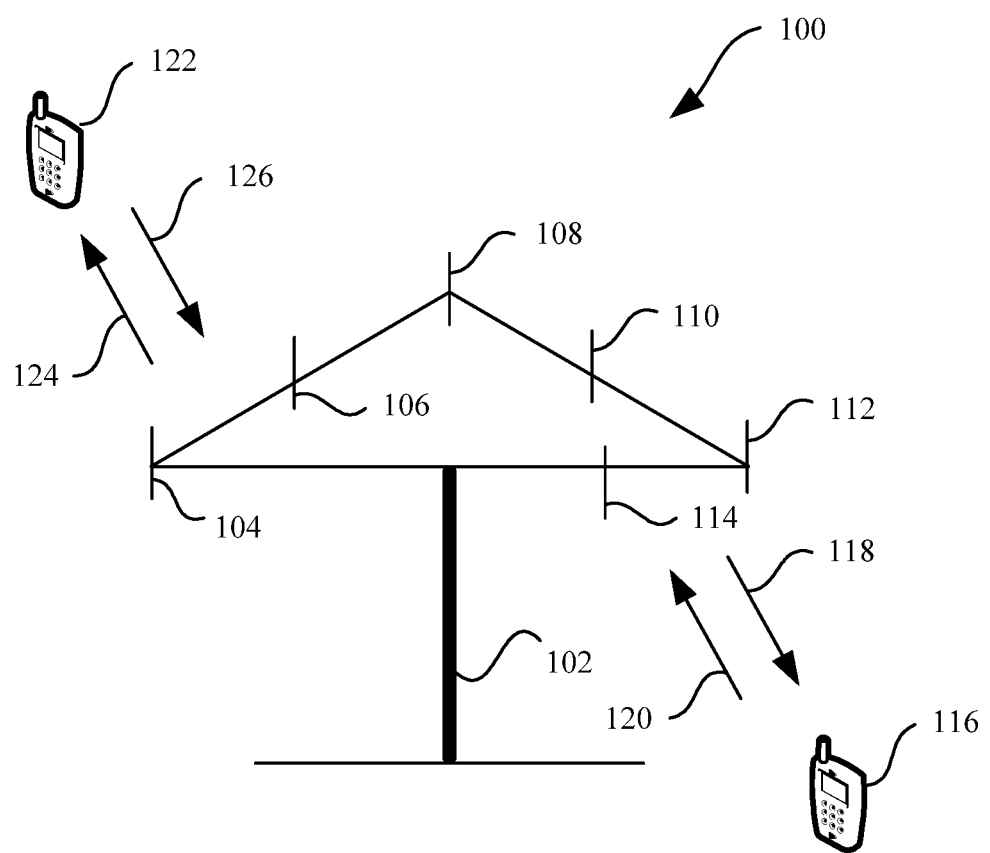
FIG. 1 is a schematic diagram of a communications system applicable to a data sending method and apparatus and a data receiving method and apparatus according to an embodiment of the present invention.

To facilitate understanding of the embodiments of the present invention, a communications system applicable to the embodiments of the present invention is first described in detail with reference to FIG. 1. FIG. 1 is a schematic diagram of a communications system applicable to a data transmission method and apparatus according to an embodiment of the present invention. As shown in FIG. 1, the communications system 100 includes a network device 102, and the network device 102 may include a plurality of antennas, such as an antenna 104, an antenna 106, an antenna 108, an antenna 110, an antenna 112, and an antenna 114. In addition, the network device 102 may additionally include a transmitter chain and a receiver chain. A person of ordinary skill in the art may understand that the transmitter chain and the receiver chain may include a plurality of components (for example, a processor, a modulator, a multiplexer, a demodulator, a demultiplexer, or an antenna) related to signal sending and receiving.

It should be understood that the technical solutions in this application may be applied to various communications systems, such as a global system for mobile communications (GSM), a code division multiple access (CDMA) system, a wideband code division multiple access (WCDMA) system, a general packet radio service (GPRS), a long term evolution (LTE) system, a long term evolution advanced (LTE-A) system, a universal mobile telecommunications system (UMTS), or a next-generation communications system (for example, a 5th generation (5G) communications system). The 5G system may also be referred to as a new generation radio access technology (NR) system.

It should be understood that the network device 102 may be a base transceiver station (BTS) in a global system for mobile communications (GSM) or code division multiple access (CDMA); or may be a NodeB (NodeB, NB) in wideband code division multiple access (WCDMA); or may be an evolved NodeB (eNB or eNodeB) in long term evolution (LTE), a relay station, an access point, a remote radio unit (RRU), a vehicle-mounted device, a wearable device, and a network-side device in a future 5G system, such as a transmission point (TP), a transmission reception point (TRP), a base station, or a small cell device. This embodiment of the present invention imposes no special limitation thereto.

The network device 102 may communicate with a plurality of terminal devices (for example, a terminal device 116 and a terminal device 122). The network device 102 may communicate with any quantity of terminal devices similar to the terminal device 116 or the terminal device 122.

It should be understood that the terminal device 116 or the terminal device 122 may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in wireless local area network (WLAN); or may be a cellular phone, a cordless telephone set, a session initiation protocol (SIP) phone, a wireless local loop (WLL) station, a personal digital assistant (PDA) device, a handheld device having a wireless communication function, a computing device, another processing device connected to a wireless modem, a vehicle-mounted device, a wearable device, and a next-generation communications system, for example, a terminal device in a 5G network or a terminal device in a future evolved public land mobile network (PLMN). This embodiment of the present invention imposes no special limitation thereto.

As shown in FIG. 1, the terminal device 116 communicates with the antenna 112 and the antenna 114. The antenna 112 and the antenna 114 each send information to the terminal device 116 over a forward link 118, and receive information from the terminal device 116 over a reverse link 120. In addition, the terminal device 122 communicates with the antenna 104 and the antenna 106. The antenna 104 and the antenna 106 each send information to the terminal device 122 over a forward link 124, and receive information from the terminal device 122 over a reverse link 126.

For example, in a frequency division duplex (FDD) system, the forward link 118 and the reverse link 120 may use different frequency bands, and the forward link 124 and the reverse link 126 may use different frequency bands.

For another example, in a time division duplex (TDD) system and a full duplex system, the forward link 118 and the reverse link 120 may use a same frequency band, and the forward link 124 and the reverse link 126 may use a same frequency band.

Each antenna (or an antenna group including a plurality of antennas) and/or area designed for communication are/is referred to as a sector of the network device 102. For example, the antenna group may be designed to communicate with a terminal device in a sector of coverage of the network device 102. In a process in which the network device 102 communicates with the terminal device 116 and the terminal device 122 over the forward link 118 and the forward link 124 respectively, transmit antennas of the network device 102 may improve signal-to-noise ratios of the forward link 118 and the forward link 124 through beamforming. In addition, when the network device 102 sends, through beamforming, signals to the terminal device 116 and the terminal device 122 that are randomly scattered in related coverage, interference to a mobile device in a neighboring cell is less than that caused when a network device sends signals to all terminal devices of the network device by using a single antenna.

The network device 102, the terminal device 116, or the terminal device 122 may be a wireless communication sending apparatus and/or a wireless communication receiving apparatus. When sending data, the wireless communication sending apparatus may encode the data for transmission. Specifically, the wireless communication sending apparatus may obtain (for example, generate, receive from another communications apparatus, or store in a memory) a specific quantity of data bits that need to be sent to the wireless communication receiving apparatus through a channel. The data bits may be included in a transport block (or a plurality of transport blocks) of the data, and the transport block may be segmented into a plurality of code blocks.

In addition, the communications system 100 may be a public land mobile network (PLMN), a device-to-device (D2D) network, a machine-to-machine (M2M) network, or another network. FIG. 1 is merely a simplified schematic diagram of an example for ease of understanding. The network may further include another network device that is not shown in FIG. 1.

Figure 2:
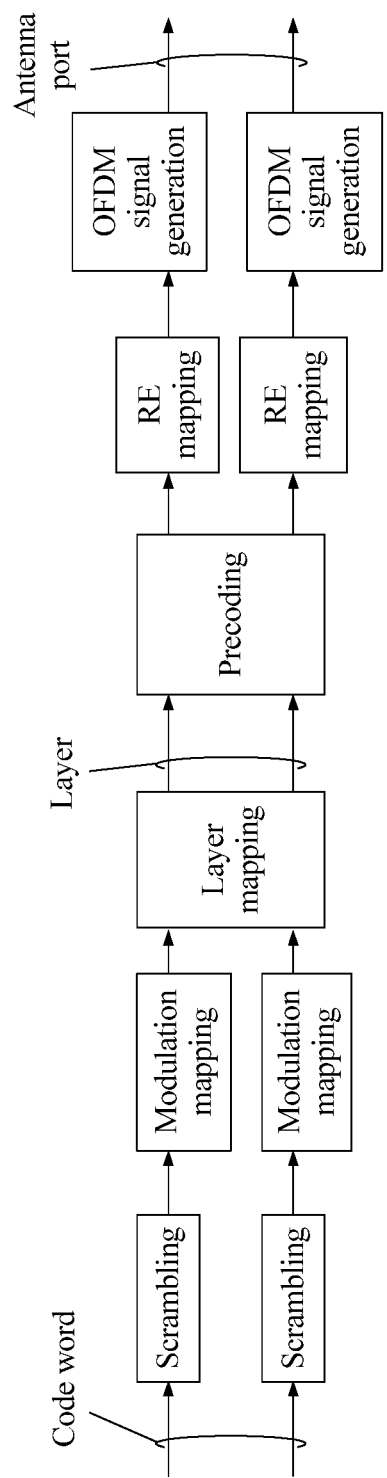
FIG. 2 is a schematic diagram of a downlink physical channel processing process used in an existing LTE system.

For ease of understanding of this embodiment of the present invention, the following briefly describes a downlink physical channel processing process in an LTE system with reference to FIG. 2. FIG. 2 is a schematic diagram of a downlink physical channel processing process used in an existing LTE system. A processing object of the downlink physical channel processing process is a code word, and the code word is usually a bit stream that undergoes encoding (including at least channel coding). The code word is scrambled to generate a scrambled bit stream. Modulation mapping is performed on the scrambled bit stream to obtain a modulated symbol stream. The modulated symbol stream is mapped to a plurality of layers through layer mapping. For ease of differentiation and description, in this embodiment of the present invention, a symbol stream obtained after layer mapping may be referred to as a layer-mapping spatial layer (or referred to as a layer mapping spatial stream or a layer mapping symbol stream). The layer-mapping spatial layer is precoded to obtain a plurality of precoded data streams (or referred to as precoded symbol streams). The precoded symbol stream is mapped to a plurality of resource elements (RE) through RE based mapping. Then orthogonal frequency division multiplexing (OFDM) modulation is performed on these REs to generate OFDM symbol streams. Subsequently, the OFDM symbol streams are transmitted through an antenna port.

A precoding technology may mean that a to-be-transmitted signal is preprocessed at a transmit end when a channel state is known, in other words, the to-be-transmitted signal is processed by using a precoding matrix that matches a channel resource, so that a precoded to-be-transmitted signal adapts to a channel, and complexity of eliminating interchannel impact at a receive end is reduced. Therefore, received signal quality (for example, a signal-to-noise ratio (or Signal to Interference plus Noise Ratio, SINR)) is improved by precoding the to-be-transmitted signal. Therefore, transmission between a transmit end device and a plurality of receive end devices can be performed on a same time-frequency resource by using the precoding technology, in other words, MU-MIMO is implemented. It should be noted that related description of the precoding technology is only used as an example, and is not used to limit the protection scope of the embodiments of the present invention. In a specific implementation process, precoding may be performed in another manner (for example, when a channel matrix cannot be learned of, precoding is performed by using a preset precoding matrix or in a weighted processing manner). Specific content is not described in this specification.

However, when CSI cannot be obtained because a channel environment rapidly changes or the like, the receive end usually feeds back long-term broadband CSI, and a precoding matrix determined based on such a CSI feedback is inaccurate. Consequently, a precoded to-be-transmitted signal cannot accurately adapt to a channel, and finally received signal quality is reduced. Therefore, it is desirable to provide a transmission scheme to improve received signal quality and improve data transmission reliability.

It should be noted herein that, in this embodiment of the present invention, the transmission scheme (or referred to as a transmission manner) may be a transmission scheme defined in an existing protocol (for example, an LTE protocol), or may be a transmission scheme defined in a related protocol in future 5G This embodiment of the present invention imposes no special limitation thereto. It should be understood that the transmission scheme may be a name of a technical solution used for data transmission, and should not constitute any limitation on this embodiment of the present invention. This embodiment of the present invention does not exclude a possibility of replacing the transmission scheme with another name in a future protocol.

This application provides a transmission scheme to help obtain a diversity gain to a greater extent, improve received signal quality, and improve data transmission reliability. For ease of differentiation and description, the transmission scheme provided in this application may be referred to as precoder cycling based transmit diversity. However, it should be understood that a name of the foregoing transmission scheme is only defined for differentiation from an existing transmission scheme, and should not constitute any limitation on this embodiment of the present invention. This embodiment of the present invention also does not exclude a possibility of replacing the name with another name in a future protocol.

The following describes the transmission scheme in detail with reference to the accompanying drawings.

First, the data transmission method in the embodiments of the present invention is described in detail with reference to FIG. 3 to FIG. 9. It should be understood that these examples are merely intended to help a person skilled in the art better understand the embodiments of the present invention, instead of limiting the scope of the embodiments of the present invention. It should be understood that, if the transmit end is a network device and the receive end is a terminal device, the network device may send downlink data to at least two terminal devices on a same time-frequency resource; or if the transmit end is a terminal device and the receive end is a network device, at least two terminal devices may send uplink data to one network device on a same time-frequency resource.

Without loss of generality, the following uses an example of data transmission between a network device and a first terminal device to describe the data transmission method in the embodiments of the present invention. It should be understood that the network device may correspond to the network device 102 in FIG. 1, and the first terminal device may be any one of the plurality of terminal devices that are in communication connection to the network device, and may correspond to the terminal device 116 or the terminal device 122 in FIG. 1.

Particularly, it should be noted that, in the embodiments of the present invention, for ease of description, precoding is used for implementing spatial multiplexing when there is no special description. However, a person skilled in the art should understand that the precoding mentioned in this specification may be described as spatial multiplexing precoding more generally if there is no special description or if the precoding is not in conflict with an actual function or inherent logic of the precoding in related descriptions.

Figure 3:
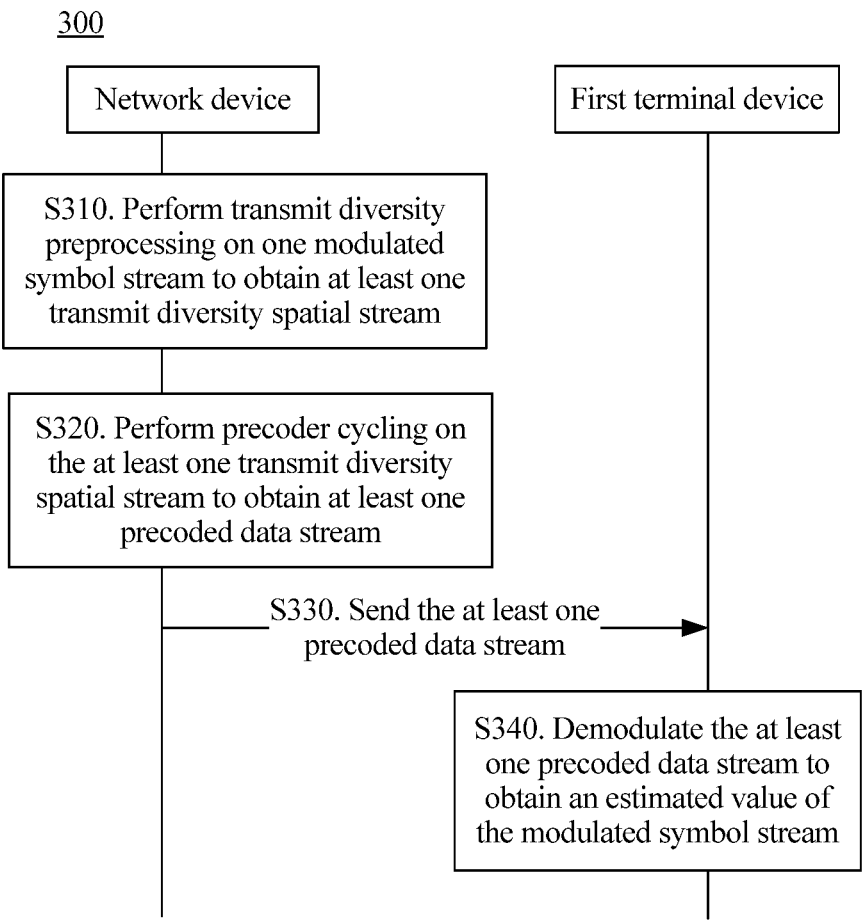
FIG. 3 is a schematic flowchart of a data transmission method according to an embodiment of the present invention.

FIG. 3 is a schematic flowchart of a data transmission method 300 according to an embodiment of the present invention from a perspective of device interaction.

Specifically, FIG. 3 shows a downlink data transmission process.

It should be noted that, in this embodiment of the present invention, one modulated symbol stream is only used as an example to describe the data sending method. However, this should not constitute any limitation on this embodiment of the present invention. A network device may perform transmit diversity preprocessing on a plurality of modulated symbol streams to obtain at least one transmit diversity spatial stream, and the network device may perform transmit diversity preprocessing on the plurality of modulated symbol streams by using a layer mapping method in LTE. Without loss of generality, the following uses a process of processing one modulated symbol stream as an example to describe this embodiment of the present invention in detail.

As shown in FIG. 3, the method 300 includes the following operations.

Operation S310. The network device performs transmit diversity preprocessing on one modulated symbol stream to obtain at least one transmit diversity spatial stream.

In this embodiment of the present invention, the modulated symbol stream may be a modulated symbol stream to be sent to a first terminal device. The network device may perform transmit diversity preprocessing on the modulated symbol stream to obtain the at least one transmit diversity spatial stream. The network device may perform transmit diversity preprocessing on the modulated symbol by using a prior art. By using SFTD as an example, layer mapping and Alamouti coding may be performed on an original modulated symbol stream to obtain at least one transmit diversity spatial stream. However, it should be understood that the foregoing enumerated specific transmit diversity preprocessing method is merely a possible implementation, and should not constitute any limitation on this embodiment of the present invention. This embodiment of the present invention is also not limited thereto. For example, the network device may directly obtain the at least one transmit diversity spatial stream by performing the transmit diversity preprocessing operation on the modulated symbol stream.

It should be understood that, in this embodiment of the present invention, one modulated symbol stream is only used as an example to describe the data sending method. However, this should not constitute any limitation on this embodiment of the present invention. The network device may perform transmit diversity preprocessing on a plurality of modulated symbol streams to obtain a plurality of transmit diversity spatial streams. The network device may use a same method to perform transmit diversity preprocessing on each modulated symbol stream to obtain a transmit diversity spatial stream. In this embodiment of the present invention, without loss of generality, the process of processing one modulated symbol stream is used to describe this embodiment of the present invention in detail.

In one embodiment, operation S310 includes:

performing, by the network device, layer mapping on the modulated symbol stream to obtain at least one layer-mapping spatial layer; and performing, by the network device, a transmit diversity operation on the at least one layer-mapping spatial layer to obtain the at least one transmit diversity spatial stream.

For ease of understanding and differentiation, spatial streams obtained after different processing have different names in this application. For example, a spatial stream obtained after layer mapping is referred to as a layer-mapping spatial layer, a spatial stream obtained after a transmit diversity operation is referred to as a transmit diversity spatial stream, and a spatial stream obtained after precoding mentioned in the foregoing descriptions is referred to as a precoded data stream. However, a person skilled in the art should understand that various spatial streams mentioned in this application all belong to modulated symbol streams. It should be further understood that names such as the layer-mapping spatial layer, the transmit diversity spatial stream, and the precoded data stream are defined for ease of differentiation and should not constitute any limitation on this embodiment of the present invention. This application does not exclude a possibility of replacing the foregoing names with other names in an existing protocol or a future protocol.

By way of example but not limitation, the transmit diversity operation may include diversity manners such as a space time transmit diversity (STTD, or referred to as space time block code (STBC)), a space-frequency transmit diversity (SFTD, or referred to as space frequency block coding (SFBC)), a time switched transmit diversity (TSTD), frequency switched transmit diversity (FSTD), an orthogonal transmit diversity (OTD), a cyclic delay diversity (CDD), and layer shifting, and diversity manners obtained after derivation, evolution, and combination of the foregoing various diversity manners.

For example, one transmit diversity spatial stream may be obtained if a transmit diversity operation is performed on one layer-mapping spatial layer through CDD processing; and at least two transmit diversity spatial streams may be obtained if transmit diversity preprocessing is performed on one layer-mapping spatial layer through SFTD or STTD processing.

For ease of understanding and description, the following uses SFTD as an example to describe this embodiment of the present invention in detail. However, it should be understood that the following description is merely an example, and should not constitute any limitation on this embodiment of the present invention. Any one of the foregoing enumerated transmit diversity operation methods is applicable to this embodiment of the present invention.

By using SFTD as an example, the transmit diversity preprocessing may be understood as a process of performing layer mapping and Alamouti coding (in other words, space frequency block coding) on the modulated symbol stream to obtain at least two transmit diversity spatial streams, and the process (in other words, the layer mapping and Alamouti coding process) may also be considered as a precoding process. However, the precoding is obviously different from precoding used for implementing spatial multiplexing. The Alamouti coding may be understood as a possible implementation of the transmit diversity operation. Correspondingly, still by using SFTD as an example, a transmit diversity transmission scheme in the prior art may be a transmission scheme of performing transmit diversity preprocessing on one modulated symbol stream to obtain at least two transmit diversity spatial streams.

If transmit diversity preprocessing performed on the modulated symbol stream is also considered as precoding, the method in this embodiment is equivalent to performing two-level precoding on the modulated symbol stream, which may be represented as $Y=F_1(F_2(X))$, where $F_2$ represents transmit-diversity-corresponding precoding (in other words, transmit diversity preprocessing) that is used to implement transmit diversity, $F_1$ represents beamforming precoding that is used to implement spatial multiplexing, and X represents a modulated symbol stream. It can be understood that different transmit diversity operation methods bring different quantities of ports of finally sent precoded data streams. For example, when the transmit diversity operation method is the SFTD, the quantity of ports may be 2; or when the transmit diversity operation method is the FSTD, the quantity of ports may be 4.

The SFTD is used as an example. Assuming that two layer-mapping spatial layers obtained by performing layer mapping on the original modulated symbol stream may be represented as $$\begin{bmatrix} s_1 \\ s_2 \end{bmatrix},$$

two transmit diversity spatial streams obtained by performing a transmit diversity operation on the two layer-mapping spatial layers may be represented as $$\begin{bmatrix} s_1 & -s_2^* \\ s_2 & s_1^* \end{bmatrix},$$

where s* represents a conjugate of s.

Operation S320. The network device performs precoder cycling on the at least one transmit diversity spatial stream to obtain at least one precoded data stream.

After performing transmit diversity preprocessing on the modulated symbol stream to obtain the at least one transmit diversity spatial stream, the network device may precode the at least one transmit diversity spatial stream to obtain the at least one precoded data stream. In this embodiment of the present invention different from the prior art, the at least one spatial stream is precoded by using a precoder cycling method. In other words, each spatial stream is precoded by using at least two different precoding vectors.

It should be noted that each of the at least one transmit diversity spatial stream herein may correspond to at least one precoded data stream, and a quantity of precoded data streams depends on a quantity of antenna ports.

For ease of understanding of this embodiment of the present invention, a prior-art process of precoding the at least one transmit diversity spatial stream obtained after transmit diversity preprocessing is briefly described first.

The SFTD is still used as an example. The at least one transmit diversity spatial stream obtained after transmit diversity preprocessing may be x (x≥2, and x is a natural number) spatial streams. It is assumed that x is equal to 2, two transmit signals of the transmit diversity spatial streams obtained by performing transmit diversity preprocessing on the modulated symbol stream may be as follows:

$$S = \begin{bmatrix} s_1 & -s_2^* \\ s_2 & s_1^* \end{bmatrix},$$

where $s^*$ represents a conjugate of s, $[s_1 -s_2^*]$ represents one stream, and $[s_1 -s_2^*]$ represents another stream.

The signals are precoded to obtain the following precoded data stream:

$$WS = [w_1 \ w_2] \begin{bmatrix} s_1 & -s_2^* \\ s_2 & s_1^* \end{bmatrix},$$

where $W=[w_1 \ w_2]$ is a precoding matrix. It can be learned that different data streams are precoded by using different precoding vectors. The at least one transmit diversity spatial stream obtained after transmit diversity preprocessing is precoded to obtain the at least one precoded data stream.

In this embodiment of the present invention, the at least one transmit diversity spatial stream is precoded by using a precoder cycling method. To be specific, there are at least two precoding vectors used to precode any one of the at least one transmit diversity spatial stream. In other words, there are at least two equivalent channel matrices corresponding to each spatial stream.

Specifically, the precoder cycling may be classified into time-frequency resource block based precoder cycling and RE level precoder cycling. In other words, the network device may perform precoder cycling on the at least one spatial stream based on the two different granularities.

In other words, in operation S320, the network device may perform precoder cycling on the at least one transmit diversity spatial stream by using at least one of the following methods:

Method 1:

The network device performs time-frequency resource block based precoder cycling on the at least one transmit diversity spatial stream.

Method 2:

The network device performs RE based precoder cycling on the at least one transmit diversity spatial stream.

Specifically, it is assumed that the network device performs transmit diversity (for example, the SFTD) preprocessing on the modulated symbol stream to obtain at least two transmit diversity spatial streams, and it is assumed that there are x streams, where x is a natural number greater than or equal to 2. In this case, the network device may perform precoder cycling on each of the at least two transmit diversity spatial streams. For ease of understanding, the following describes method 1 and method 2 in detail with reference to FIG. 4 to FIG. 6.

In method 1, the network device may perform time-frequency resource block based precoder cycling on the x transmit diversity spatial streams. On one time-frequency resource block, each transmit diversity spatial stream corresponds to one demodulation reference signal (DMRS) port, the x transmit diversity spatial streams correspond to x DMRS ports, and each DMRS port corresponds to one precoding vector on one time-frequency resource block.

In one embodiment, one time-frequency resource block may include at least one of the following: a part of one resource element, one resource element, or more resource elements. The resource element may be understood as a minimum scheduling unit for physical layer transmission. The time-frequency resource block may include at least two REs. In a possible design, one resource element may be one RB. In other words, the time-frequency resource block may include a part of one RB, one RB, or a plurality of RBs.

Time-frequency resource block based precoding means that a precoding granularity is a time-frequency resource block. Each DMRS port has one precoding vector on one time-frequency resource block, and one DMRS port corresponds to different precoding vectors on any two consecutive time-frequency resource blocks. It should be noted that "consecutive" herein may be consecutive in time domain or consecutive in frequency domain; or the two time-frequency resource blocks are only two time-frequency resource blocks that are closely neighboring to each other in a scheduling process, and the two time-frequency resource blocks are inconsecutive in terms of resource distribution. In addition, different DMRS ports also correspond to different precoding vectors on a same time-frequency resource (or a same time-frequency resource block). The precoding vector may be cyclically used in a cycle of at least two time-frequency resource blocks. In other words, precoder cycling is performed in a cycle of at least two time-frequency resource blocks.

In one embodiment, operation S320 includes:

performing, by the network device, time-frequency resource block based precoding on each of the at least one transmit diversity spatial stream based on a precoding vector corresponding to the transmit diversity spatial stream on each time-frequency resource block, to obtain the at least one precoded data stream; or performing, by the network device, time-frequency resource block based precoding on x transmit diversity spatial streams based on a precoding matrix corresponding to the x transmit diversity spatial streams on each time-frequency resource block, where the precoding matrix is combined by combining x precoding vectors.

It should be noted herein that the time-frequency resource block may include a virtual time-frequency resource block. If each time-frequency resource block is one RB, the virtual time-frequency resource block may correspond to a virtual resource block (VRB) defined in an existing protocol, and a physical time-frequency resource block may correspond to a physical resource block (PRB) defined in an existing protocol. The any two consecutive time-frequency resource blocks may be logically consecutive virtual time-frequency resource blocks, or may be physically consecutive physical time-frequency resource blocks. This embodiment of the present invention imposes no special limitation thereto. In this embodiment of the present invention, an example of using an RB as a time-frequency resource block is used only for ease of understanding, and the precoder cycling is described in detail with reference to the accompanying drawings.

Figure 4:
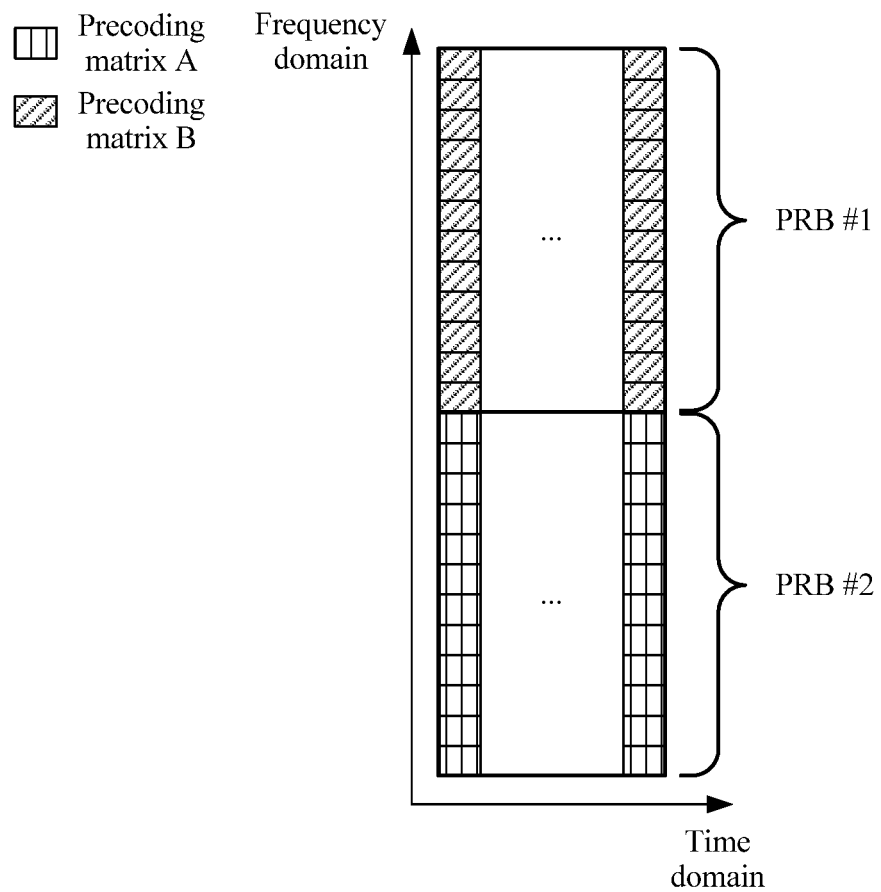
FIG. 4 is a schematic diagram of time-frequency resource block based precoder cycling.

FIG. 4 is a schematic diagram of time-frequency resource block based precoder cycling. Specifically, FIG. 4 is a schematic diagram of precoder cycling performed in a granularity of a PRB (in other words, an example of a time-frequency resource block). As shown in FIG. 4, there are x transmit diversity spatial streams, and therefore a precoding matrix corresponding to the x transmit diversity spatial streams on one time-frequency resource block (in other words, one PRB in this embodiment) is a precoding matrix obtained by combining x precoding vectors. Therefore, a PRB #1 corresponds to a precoding matrix A, which may be, for example, $W_A$; and a PRB #2 corresponds to a precoding matrix B, which may be, for example, $W_B$. The precoding matrix A and the precoding matrix B are two different precoding matrices. For each transmit diversity spatial stream, a precoding vector corresponding to the PRB #1 is also different from a precoding vector corresponding to the PRB #2.

It is assumed that a quantity x of the at least two spatial streams is 2, the two transmit diversity spatial streams may be:

$$\begin{bmatrix} s_1 & -s_2^* \\ s_2 & s_1^* \end{bmatrix}.$$

On the PRB #1, a precoding matrix used for precoding the two transmit diversity spatial streams is a matrix obtained by combining two precoding vectors. In other words, $W_A=[w_1\ w_2]$. On the PRB #2, a precoding matrix used for precoding the two transmit diversity spatial streams is $W_B=[w_3\ w_4]$ Alternatively, on the PRB #1, each of the two transmit diversity spatial streams is precoded by using one column vector in $[w_1\ w_2]$; and on the PRB #2, each of the two transmit diversity spatial streams is precoded by using one column vector in $[w_3\ w_4]$.

It should be understood that only an example in which x is equal to 2 is used for description above. However, this should not constitute any limitation on this embodiment of the present invention. For example, a value of x may be 1 or greater than 2.

Specifically, when x>2, the precoding matrix used for precoding the at least two spatial streams is a precoding matrix obtained by combining x precoding column vectors, in other words, $[w_1\ w_2\ \Lambda\ w_x]$ Alternatively, each of the at least two spatial streams is precoded by using one column vector in $[w_1\ w_2 \Lambda w_x]$ on each PRB.

When x=1, one transmit diversity spatial stream is precoded, the transmit diversity spatial stream corresponds to one DMRS port, and the transmit diversity spatial stream is precoded by using one precoding vector.

It should be noted that precoding vectors used by the network device to precode transmit diversity spatial streams are different on any two consecutive time-frequency resource blocks. However, this does not mean that all time-frequency resource blocks used to carry the transmit diversity spatial streams correspond to different precoding vectors. The precoder cycling may be performed in a cycle of at least two time-frequency resource blocks. For example, in FIG. 4, two time-frequency resource blocks may be used as one cycle. In this case, precoding is performed by using the precoding matrix A on the PRB #1, precoding is performed by using the precoding matrix B on the PRB #2, precoding is performed by using the precoding matrix A on a PRB #3, precoding is performed by using the precoding matrix B on a PRB #4, and so on.

It should be further noted that, if the at least one transmit diversity spatial stream is carried on only one time-frequency resource block, time-frequency resource block based precoder cycling is the same as precoding in the prior art. The network device may precode the at least one transmit diversity spatial stream by using a precoding matrix corresponding to the time-frequency resource block.

Through the foregoing precoder cycling, different precoding vectors are used for a same transmit diversity spatial stream on different time-frequency resource blocks. When a channel environment changes or estimation is inaccurate, different precoding vectors may be used on different time-frequency resources for channel matching, and at least a time-domain diversity gain or a frequency-domain diversity gain may be obtained. In addition, transmit diversity preprocessing is performed before precoding, so that at least a spatial diversity gain can be obtained by performing spatial transmit diversity on an original modulated symbol stream. Therefore, this helps obtain transmit diversity gains in a plurality of dimensions, improves received signal quality, and improves data transmission reliability, so that robustness of a communications system can be improved.

It should be understood that, only for ease of understanding, an example of using one PRB as one time-frequency resource block is used above to describe time-frequency resource block based precoder cycling in detail. However, this should not constitute any limitation on this embodiment of the present invention. The time-frequency resource block may be alternatively an RB group (RBG) including a plurality of RBs. For example, the plurality of RBs in the RB group correspond to a same precoding matrix, and any two consecutive RB groups correspond to different precoding matrices. Alternatively, the time-frequency resource block may be a part of one RB, for example, may be a ½ RB, or a ¼ RB. A definition of the time-frequency resource block is not specially limited in this embodiment of the present invention.

It should be noted that, for the foregoing enumerated RB, RBG, PRB, and VRB, refer to definitions in an existing protocol (for example, an LTE protocol). However, this application does not exclude new definitions of the foregoing enumerated RB, RBG, PRB, and VRB in a future protocol, or exclude other names used to replace the foregoing names.

In method 2, the network device performs RE based precoder cycling on the x transmit diversity spatial stream. In other words, a precoder cycling granularity is further refined on one time-frequency resource block, so that the time-frequency resource block includes at least two REs corresponding to different precoding matrices. A precoder cycling cycle may be one time-frequency resource block, in other words, may be REs whose quantity is an integer multiple of y.

In this precoder cycling method, the network device may perform RE based precoding on each of the at least one transmit diversity spatial stream based on the at least two precoding vectors corresponding to the transmit diversity spatial stream on each time-frequency resource block. To be specific, the network device performs RE based precoding on the x transmit diversity spatial streams based on y precoding matrices corresponding to the x transmit diversity spatial streams on each time-frequency resource block, and each precoding matrix is obtained by combining x precoding vectors.

Specifically, a correspondence between a quantity of layer-mapping spatial layers and a quantity of DMRS ports may be defined as any one of the following:

Definition 1: A quantity of layer-mapping spatial layers may be different from a quantity of DMRS ports corresponding to the layer-mapping spatial layers.

It is assumed that a quantity of the at least one layer-mapping spatial layer is x ($x \geq 1$, and x is a natural number), and each layer-mapping spatial layer corresponds to y ($y \geq 2$, and y is a natural number) DMRS ports on one time-frequency resource block. In this case, the x layer-mapping spatial layers correspond to x×y DMRS ports on the time-frequency resource block, and correspond to x×y precoding vectors; or the x layer-mapping spatial layers correspond to y precoding matrices, and each precoding matrix is obtained by combining x precoding vectors.

For example, a quantity x of layer-mapping spatial layers obtained after layer mapping is 2, and each layer may correspond to four (in other words, y=4) DMRS ports on one time-frequency resource block, in other words, correspond to four precoding vectors. In this case, there are two layer-mapping spatial layers, the two layer-mapping spatial layers correspond to eight DMRS ports and eight precoding vectors. In other words, one layer corresponds to a plurality of DMRS ports, and each DMRS port corresponds to one precoding vector.

Definition 2: A quantity of layer-mapping spatial layers may be the same as a quantity of DMRS ports corresponding to the layer-mapping spatial layers.

It is assumed that a quantity z of the at least one layer-mapping spatial layer is x×y ($x \geq 1$, $y \geq 2$, and x, y, and z are all natural numbers), and each layer-mapping spatial layer corresponds to one DMRS port on one time-frequency resource block. In this case, the x×y layer-mapping spatial layers correspond to z DMRS ports on the time-frequency resource block, and correspond to z precoding vectors; or the x×y layer-mapping spatial layers correspond to y precoding matrices, and each precoding matrix is obtained by combining x precoding vectors.

For example, a quantity z of layer-mapping spatial layers obtained after layer mapping is 8, and each layer may correspond to one DMRS port on one time-frequency resource block. In this case, the eight layer-mapping spatial layers correspond to eight DMRS ports and eight precoding vectors. In other words, one layer corresponds to one DMRS port, and each DMRS port corresponds to one precoding vector.

Definition 3: A quantity of layer-mapping spatial layers may be the same as a quantity of DMRS ports corresponding to the layer-mapping spatial layers.

It is assumed that a quantity of the at least one layer-mapping spatial layer is x ($x \geq 1$, and x is a natural number), each layer-mapping spatial layer corresponds to one DMRS port on one time-frequency resource block, the x layer-mapping spatial layers correspond to x DMRS ports, and each DMRS port corresponds to y ($y \geq 2$, and y is a natural number) precoding vectors. In this case, the x layer-mapping spatial layers correspond to x×y precoding vectors; or the x layer-mapping spatial layers correspond to y precoding matrices, and each precoding matrix is obtained by combining x precoding vectors.

For example, a quantity x of layer-mapping spatial layers obtained after layer mapping is 2, each layer-mapping spatial layer corresponds to one DMRS port on one time-frequency resource block, and each DMRS port correspond to four (y=4) precoding vectors. In this case, there are two layer-mapping spatial layers, two DMRS ports, and eight precoding vectors. In other words, one layer corresponds to one DMRS port, and each DMRS port corresponds to a plurality of precoding vectors.

In definition 1 and definition 2, each of the at least one transmit diversity spatial stream corresponds to at least two DMRS ports on one time-frequency resource block, and each DMRS port corresponds to one precoding vector. For a definition of the DMRS port, refer to a definition of a DMRS port in an existing protocol (for example, an LTE protocol). In definition 3, each of the at least one transmit diversity spatial stream corresponds to one DMRS port on one time-frequency resource block, and each DMRS port corresponds to at least two precoding vectors.

The definition of the DMRS port is slightly different from that of a DMRS port in a current protocol. However, this application does not exclude a possibility of modifying or supplementing the definition of the DMRS port in a future protocol. In this design, one DMRS may be understood as a group of DMRS ports defined in the current protocol, and each group corresponds to at least two precoding vectors. In this case, for a definition of the layer, refer to a definition of a layer in an existing protocol (for example, an LTE protocol).

It should be noted that the foregoing process of mapping a layer-mapping spatial layer to a DMRS port may specifically include: mapping the layer-mapping spatial layer to a transmit diversity spatial stream, and then mapping the transmit diversity spatial stream to the DMRS port, where a quantity of transmit diversity spatial streams may be the same as a quantity of layer-mapping spatial layers.

It should be understood that the quantity of layer-mapping spatial layers, the quantity of DMRS ports, and the quantity of precoding vectors enumerated above are merely used to describe relationships between a quantity of layers, a quantity of DMRS ports, and a quantity of precoding vectors in different definitions, and should not constitute any limitation on this embodiment of the present invention.

RE level based precoding means that a precoding granularity is an RE, or RE level based precoding is referred to as RE level precoder cycling. An RE level indicates that at least two REs in one time-frequency resource block correspond to different precoding matrices. It can be understood that, for x transmit diversity spatial streams, a precoding matrix is a matrix including x column vectors. When there is one transmit diversity spatial stream, x=1 and there is one precoding vector. For brevity, descriptions of same or similar cases are omitted below. In addition, different transmit diversity spatial streams also correspond to different precoding vectors on a same time-frequency resource (for example, a same RE).

In one embodiment, operation S320 includes:

performing, by the network device, RE based precoding on each of the at least one transmit diversity spatial stream based on at least two precoding vectors corresponding to the transmit diversity spatial stream on each time-frequency resource block, to obtain the at least one precoded data stream; or performing, by the network device, RE based precoding on the x transmit diversity spatial streams based on y precoding matrices corresponding to the x transmit diversity spatial streams on each time-frequency resource block, where the precoding matrix is obtained by combining x precoding vectors.

Figure 5:
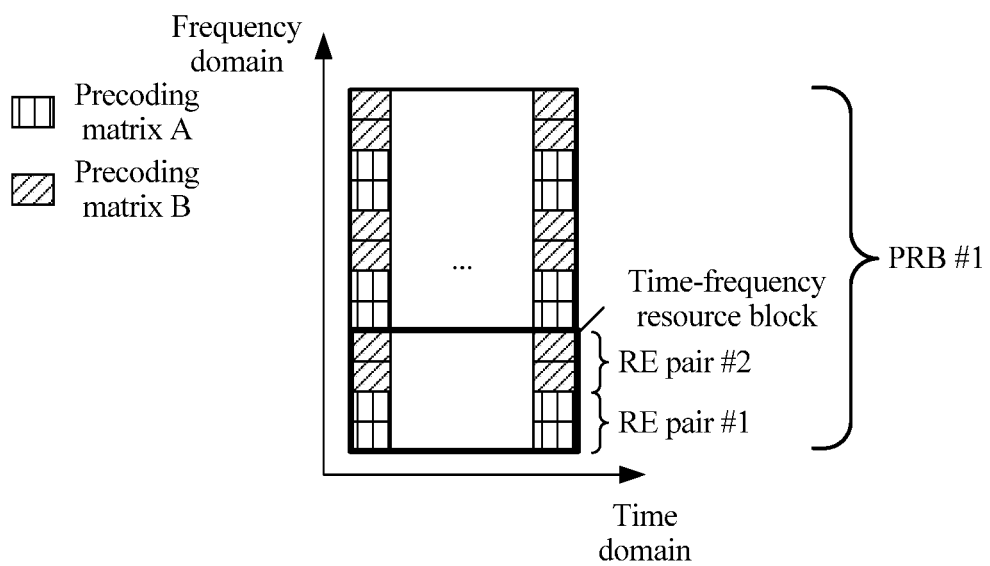
FIG. 5 is a schematic diagram of RE based precoder cycling.

FIG. 5 is a schematic diagram of RE based precoder cycling. Specifically, FIG. 5 shows a case in which one time-frequency resource block is a part of one PRB. As shown in FIG. 5, on one PRB, two consecutive REs in frequency domain may be one RE pair, and any two consecutive RE pairs correspond to different precoding matrices.

It should be noted that FIG. 5 is a schematic diagram of a precoding matrix used to precoding at least two transmit diversity spatial streams obtained after SFTD preprocessing. After the SFTD, one RE pair occupies two contiguous subcarriers in frequency domain, and occupies one symbol in time domain; and precoder cycling is also performed based on different frequency domain resources. On a same frequency domain resource, REs on any two neighboring symbols may use a same precoding vector or different precoding vectors. This embodiment of the present invention imposes no special limitation thereto.

In addition, when the transmit diversity preprocessing method is the SFTD, the at least two spatial streams may be obtained. If x=2, the precoding vector may be cyclically used in a cycle of at least four REs (in other words, at least two RE pairs (RE pair), where each RE pair includes two REs), or precoder cycling is performed in a cycle of at least two REs. In other words, a precoder cycling cycle is y RE pairs, and a value of y is 2. Therefore, the time-frequency resource block shown in FIG. 5 is a ⅓ PRB.

As shown in FIG. 5, there are x transmit diversity spatial streams, and therefore a precoding matrix corresponding to the x transmit diversity spatial streams on one PRB is a precoding matrix obtained by combining x precoding vectors. Therefore, an RE pair #1 corresponds to a precoding matrix A, which may be, for example, $W_A$; and an RE pair #2 corresponds to a precoding matrix B, which may be, for example, $W_B$. The precoding matrix A and the precoding matrix B are two different precoding matrices. For each transmit diversity spatial stream, a precoding vector corresponding to the RE pair #1 is also different from a precoding vector corresponding to the RE pair #2. However, it should be understood that FIG. 5 is a possible schematic diagram of RE level precoder cycling shown for ease of understanding, and this should not constitute any limitation on this embodiment of the present invention. For example, there may be more corresponding precoding matrices on one PRB.

Figure 6:
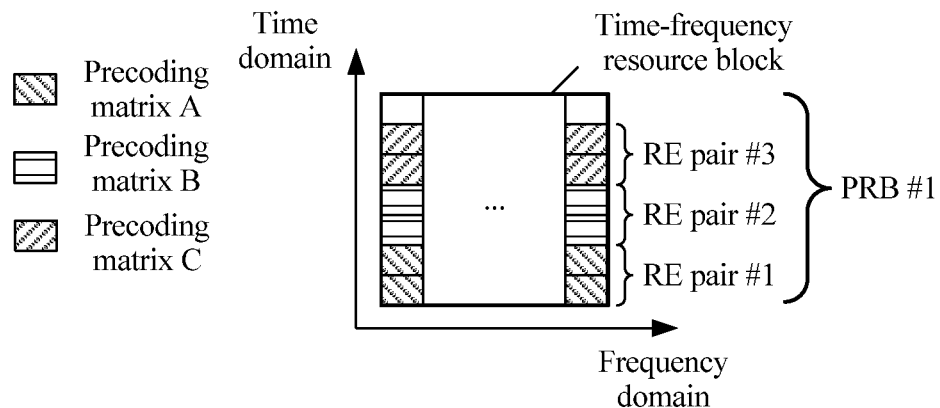
FIG. 6 is another schematic diagram of RE based precoder cycling.

FIG. 6 is another schematic diagram of RE based precoder cycling. Specifically, FIG. 6 shows a case in which one time-frequency resource block is one PRB. As shown in FIG. 6, on one PRB, two consecutive REs in time domain may be one RE pair, and the PRB may correspond to three different precoding vectors, that is, three DMRS ports. In other words, y=3, and a precoder cycling cycle is three RE pairs or one time-frequency resource block. It should be understood that the RE pair may include neighboring REs only, some neighboring REs, or no neighboring REs. For example, REs of the RE pair may be non-contiguous subcarriers or may be located on different symbols. In addition, distribution of RE pairs is not limited to a same symbol or a same subcarrier. For example, one RE pair may be two consecutive REs on one subcarrier, or may be two inconsecutive REs on one symbol, or may be two inconsecutive REs on one subcarrier, or may be two REs on different subcarriers on different symbols.

It should be further understood that a quantity of RE pairs is not limited to 2, and the quantity of RE pairs may be determined based on a quantity of spatial streams obtained through transmit diversity preprocessing. For example, the quantity of RE pairs may be any even number such as 4, 6, or 8; or even may be an odd number greater than 1. This embodiment of the present invention imposes no special limitation thereto.

Figure 7:
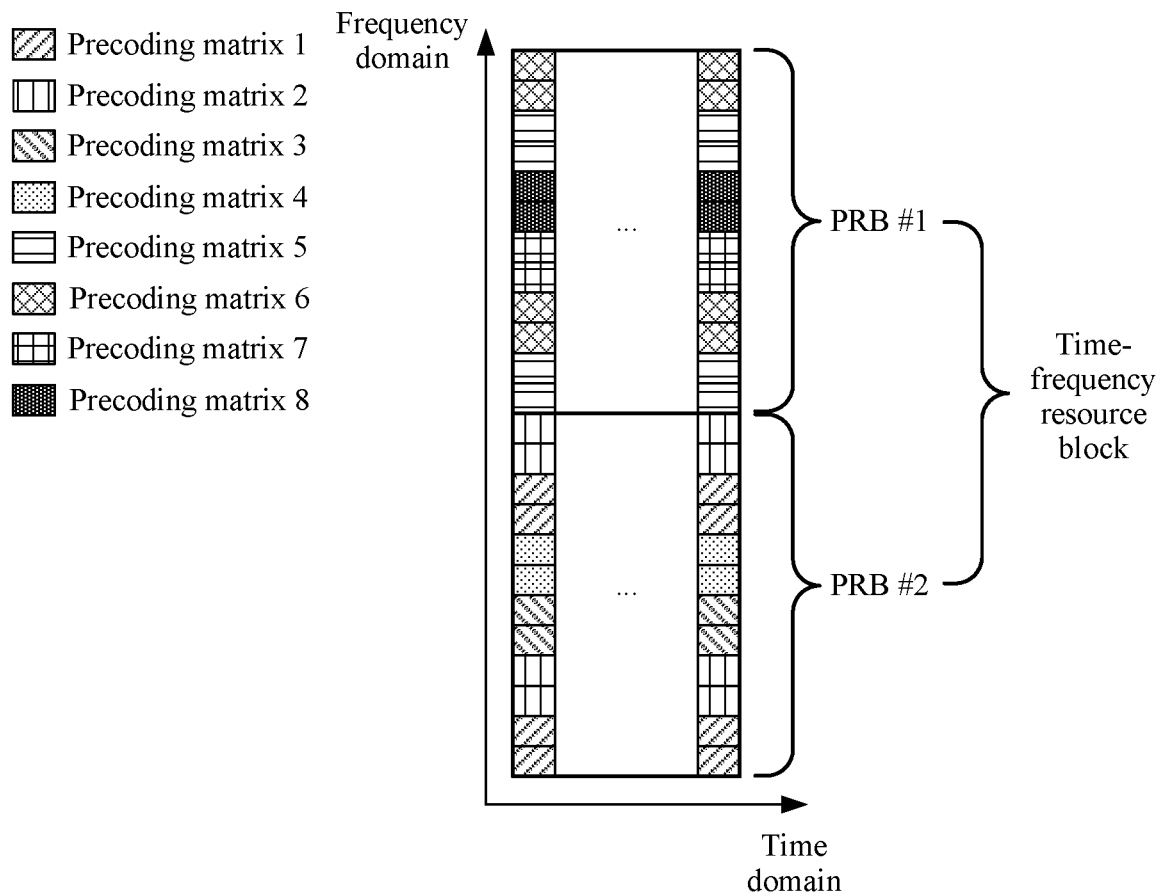
FIG. 7 is still another schematic diagram of RE based precoder cycling.

It should be further understood that there may be y corresponding precoding matrices on one time-frequency resource block during RE level precoder cycling. However, cyclically using the y precoding matrices on each time-frequency resource block is not limited in this embodiment of the present invention. FIG. 7 is still another schematic diagram of RE based precoder cycling. Specifically, FIG. 7 shows a case in which one time-frequency resource block is two PRBs. As shown in FIG. 7, on a PRB #1, RE based precoding may be performed on at least one transmit diversity spatial stream by separately using a precoding matrix 1, a precoding matrix 2, a precoding matrix 3, and a precoding matrix 4; and on a PRB #2, RE based precoding may be performed on the at least one transmit diversity spatial stream by separately using a precoding matrix 5, a precoding matrix 6, a precoding matrix 7, and a precoding matrix 8. In other words, a precoder cycling cycle is eight RE pairs (in other words, one time-frequency resource block).

It should be understood that the foregoing enumerated time-frequency resource block based precoder cycling and RE based precoder cycling are only two possible implementations of the precoder cycling, and should not constitute any limitation on this embodiment of the present invention. The network device and the terminal device may pre-negotiate a precoder cycling granularity. In a data transmission process, data is precoded and demodulated based on the pre-negotiated precoder cycling granularity.

Through the foregoing precoder cycling, different precoding vectors are used for a same transmit diversity spatial stream on a same time-frequency resource block. When a channel environment changes or estimation is inaccurate, different precoding vectors may be used on different time-frequency resources for channel matching, and at least a time-domain diversity gain or a frequency-domain diversity gain may be obtained. In addition, transmit diversity preprocessing is performed before precoding, so that at least a spatial diversity gain can be obtained by performing spatial transmit diversity on an original modulated symbol stream. Therefore, this helps obtain transmit diversity gains in a plurality of dimensions, improves received signal quality, and improves data transmission reliability, so that robustness of a communications system can be improved.

It should be noted that a precoding matrix used in the foregoing precoder cycling process may be obtained through CSI feedback, or may be obtained based on channel reciprocity, or may be specified by the network device, or even may be determined by using a combination of the foregoing methods. It should be understood that the foregoing enumerated methods for determining a precoding matrix by the network device may be implemented by using a prior art. For brevity, the method for determining a precoding matrix is not described in detail herein.

Operation S330. The network device sends the at least one precoded data stream to a first terminal device.

After performing the foregoing processing on the original modulated symbol stream, the network device obtains the at least one precoded data stream, and sends the at least one precoded data stream to the first terminal device. Correspondingly, in operation S330, the first terminal device receives the at least one precoded data stream sent by the network device.

A precoding-based transmission process may be briefly represented as the following formula:

$$Y=HWS+n, \text{ where}$$

Y represents a vector of a signal received by the first terminal device, H represents a channel matrix, W represents a precoding matrix, S represents a vector of at least one spatial stream sent by the network device, and n represents receiver noise. It can be easily learned that signal receiving is affected by the receiver noise n. In this embodiment of the present invention, for ease of description, it is assumed that the receiver noise is zero, and a signal is transmitted without an error. Actually, a plurality of solutions are provided to eliminate the foregoing noise in the prior art. For brevity, descriptions of same or similar cases are omitted below.

However, it can be understood that the network device may send precoded data streams to a plurality of terminal devices by using a MU-MIMO technology. For example, the network device may send the at least one precoded data stream to another one or more terminal devices while sending the at least one precoded data stream to the first terminal device. A transmission scheme for a precoded data stream corresponding to each terminal device may be transmit diversity, precoder cycling, spatial multiplexing, or the like. This embodiment of the present invention imposes no special limitation thereto.

In one embodiment, the at least one transmit diversity spatial stream is a spatial stream corresponding to the first terminal device in a plurality of spatial streams, and the plurality of spatial streams correspond to a plurality of terminal devices including the first terminal device.

In this embodiment of the present invention, the plurality of spatial streams correspond to the plurality of terminal devices, and it can be understood that the plurality of spatial streams are sent to the plurality of terminal devices. For example, the at least one transmit diversity spatial stream may be a spatial stream sent to the first terminal device. However, it does not indicate that the at least one transmit diversity spatial stream is directly sent to the first terminal device, and the at least one transmit diversity spatial stream may be sent to the first terminal device after other data processing. For example, in this embodiment of the present invention, the data processing process may be precoder cycling. However, it should be understood that the data processing process is not limited to precoder cycling. For example, the data processing process may be another data processing process such as precoding. This embodiment of the present invention imposes no special limitation thereto. For brevity, descriptions of same or similar cases are omitted below.

The plurality of spatial streams may be understood as symbol streams before precoding, in other words, layer-mapping spatial layers obtained after layer mapping or transmit diversity spatial streams obtained after a transmit diversity operation. A specific form is related to a transmission scheme used by the spatial stream. In this embodiment of the present invention, the spatial stream may make a general reference of a symbol stream obtained through modulation.

In addition, transmission schemes for the plurality of spatial streams may be the same. In other words, the transmission schemes are all precoder cycling based transmit diversity.

Alternatively, the plurality of spatial streams belong to at least two different transmission schemes.

In one embodiment, at least one of the plurality of spatial streams corresponds to a second terminal device, and a transmission scheme for the at least one spatial stream is precoder cycling based transmit diversity.

Figure 8:
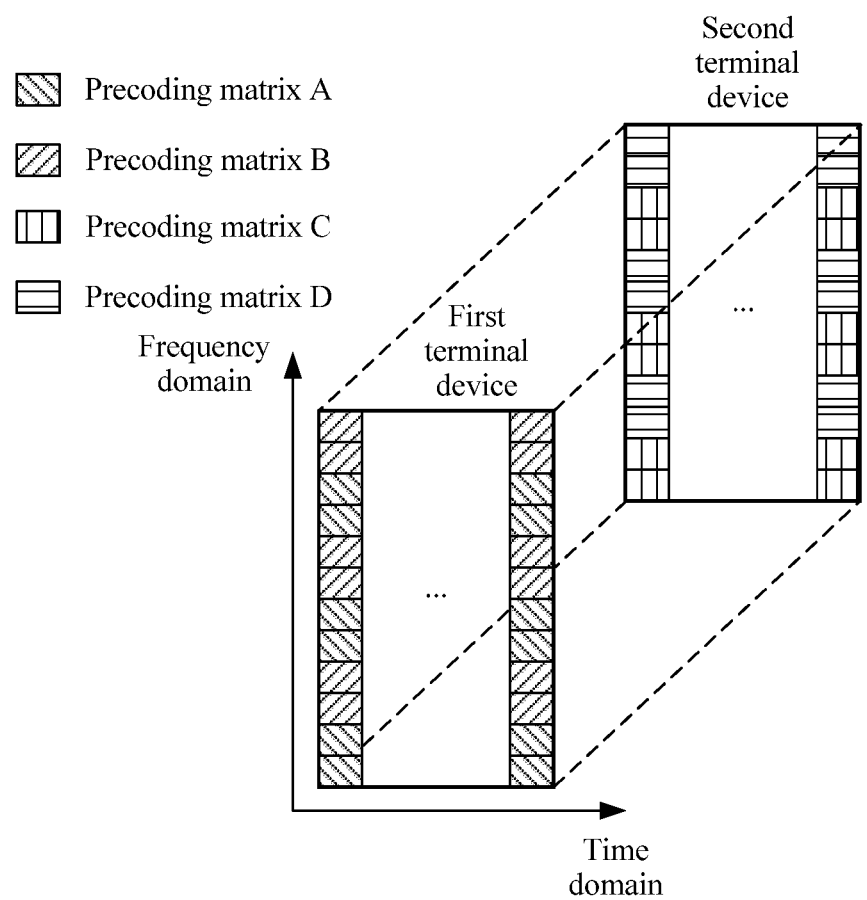
FIG. 8 is a schematic diagram in which a network device separately sends a plurality of spatial streams to a first terminal device and a second terminal device according to an embodiment of the present invention.

FIG. 8 is a schematic diagram in which the network device separately sends a plurality of spatial streams to the first terminal device and the second terminal device according to an embodiment of the present invention. As shown in FIG. 8, the network device separately sends data to the first terminal device and the second terminal device by using a same time-frequency resource and a same transmission scheme. The transmission scheme may be precoder cycling based transmit diversity, and a precoder cycling granularity may be an RE.

In one embodiment, at least one of the plurality of spatial streams corresponds to a third terminal device, and a transmission scheme for the at least one spatial stream is spatial multiplexing.

By way of example but not limitation, the spatial multiplexing includes closed-loop spatial multiplexing (CLSM).

Figure 9:
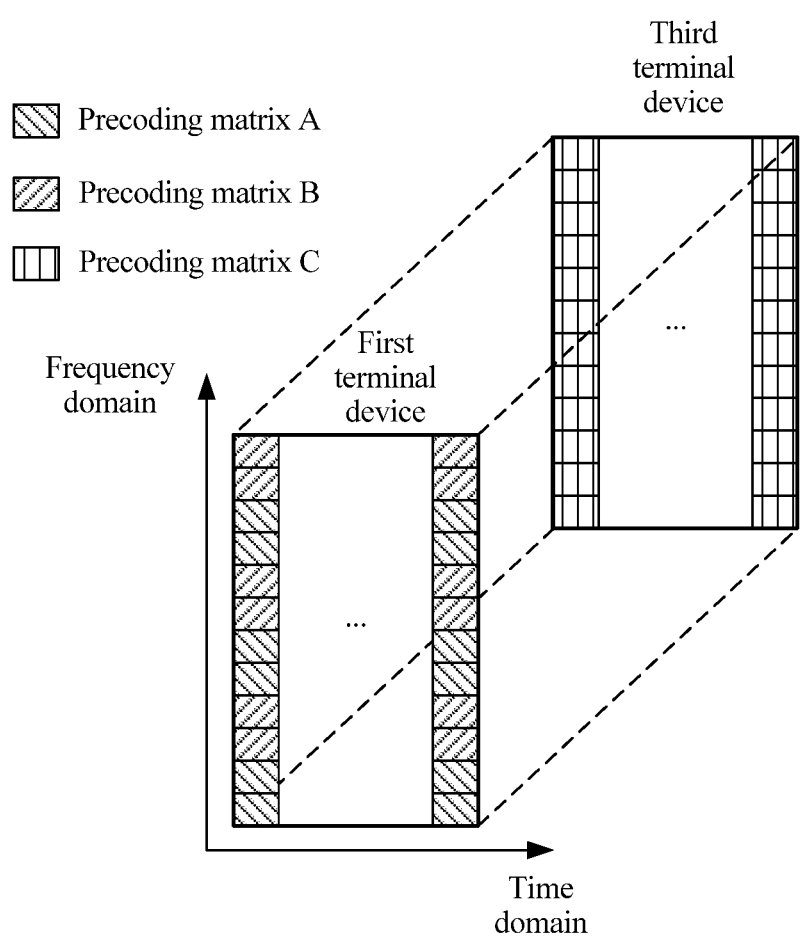
FIG. 9 is a schematic diagram in which a network device separately sends a plurality of spatial streams to a first terminal device and a third terminal device according to an embodiment of the present invention.

FIG. 9 is a schematic diagram in which the network device separately sends a plurality of spatial streams to the first terminal device and the third terminal device according to an embodiment of the present invention. As shown in FIG. 9, the network device separately sends data to the first terminal device and the third terminal device by using a same time-frequency resource and different transmission schemes. A transmission scheme used for data corresponding to the first terminal device may be precoder cycling based transmit diversity, a precoder cycling granularity is an RE level, and a transmission scheme used for data corresponding to the third terminal device is spatial multiplexing.

In one embodiment, at least one of the plurality of spatial streams corresponds to a fourth terminal device, and a transmission scheme for the at least one spatial stream is transmit diversity.

By way of example but not limitation, the transmit diversity includes diversity manners such as space time transmit diversity (STTD), a space-frequency transmit diversity (SFTD), a time switched transmit diversity (TSTD), frequency switched transmit diversity (FSTD), orthogonal transmit diversity (OTD), cyclic delay diversity (CDD), and layer shifting, diversity manners obtained after derivation, evolution, and combination of the foregoing various diversity manners, and spatial multiplexing performed based on the foregoing enumerated transmit diversity manners.

In one embodiment, at least one of the plurality of spatial streams corresponds to a fifth terminal device, and a transmission scheme for the at least one spatial stream is precoder cycling.

It should be understood that FIG. 8 and FIG. 9 are only schematic diagrams, shown for ease of understanding, in which the network device sends data to a plurality of terminal devices. However, this should not constitute any limitation on this embodiment of the present invention. The network device may send data to more terminal devices, and the network device may send the data to the more terminal devices by using one or more transmission schemes. This embodiment of the present invention imposes no special limitation thereto.

Operation S340. The first terminal device demodulates the at least one precoded data stream to obtain an estimated value of the modulated symbol stream.

After receiving the at least one precoded data stream, the first terminal device may demodulate the at least one precoded data stream based on an inverse process of operations S310 and S320 to obtain the estimated value of the original modulated symbol stream.

In one embodiment, operation S340 includes:

obtaining, by the first terminal device, an estimated value of at least one layer-mapping spatial layer from the at least one precoded data stream through demodulation; and performing, by the first terminal device, inverse layer mapping on the estimated value of the at least one layer-mapping spatial layer to obtain the estimated value of the modulated symbol stream.

First, for a received signal Y, the first terminal device may determine an equivalent channel matrix HW based on a DMRS, and obtains the estimated value of the at least one layer-mapping spatial layer through demodulation. It can be understood that the estimated value of the at least one layer-mapping spatial layer corresponds to at least one layer-mapping spatial layer obtained by the network device by performing layer mapping on the original modulated symbol stream.

It is assumed that the receiver noise is zero, and a vector r of a signal that is obtained by the first terminal device through demodulation and that is sent to the first terminal device may be represented as follows:

$$r = HW_i S_i + \sum_{j \neq i} HW_j S_j,$$

where

H represents a channel matrix used by the network device to send data to the first terminal device, $W_i$ represents a precoding matrix of a data stream sent to the first terminal device, and $W_j$ represents a precoding matrix of a data stream sent to another terminal device (for example, any one or more of the second terminal device to the fifth terminal device).

The first terminal device may process the received signal by using various receiving algorithms, so that interference is zero. Specifically, the first terminal device may design each column vector, in the precoding matrix $W_j$ of the at least one spatial stream sent to another terminal device, to be orthogonal to each row vector in H, so that $$\sum_{j \neq i} HW_j S_j$$

is zero. In other words, the interference is zero. Therefore, the first terminal device may estimate the equivalent channel matrix based on a received DMRS sent to the first terminal device, and obtain, through demodulation based on the estimated equivalent channel matrix $HW_i$, a layer-mapping spatial layer sent by the network device to the first terminal device (it can be understood that the layer-mapping spatial layer herein is estimated, namely, the estimated value of the layer-mapping spatial layer).

It should be noted that the network device performs transmit diversity preprocessing, for example, SFTD, on the original modulated symbol stream to obtain the at least one transmit diversity spatial stream, and precodes the at least one transmit diversity spatial stream by using a precoder cycling method. Therefore, the network device needs to demodulate a received signal based on different REs or precoding vectors corresponding to different RBs.

Because the network device precodes the transmit diversity spatial stream by using the precoder cycling method, there are at least two precoding vectors used for each transmit diversity spatial stream, and there are also at least two equivalent channel matrices corresponding to each precoded data stream. Therefore, the first terminal device may demodulate the at least one precoded data stream based on different equivalent channel matrices estimated by using different DMRSs.

Specifically, in operation S340, considering that a channel matrix may change in time domain and/or in frequency domain, the first terminal device may demodulate the at least one precoded data stream based on an equivalent channel matrix corresponding to each RE, and the equivalent channel matrix corresponding to each RE may be obtained through estimate interpolation based on a corresponding DMRS port.

In operation S320, the precoder cycling may be time-frequency resource block based precoder cycling, or may be RE based precoder cycling. If the precoder cycling is the time-frequency resource block based precoder cycling, in operation S340, an equivalent channel matrix corresponding to each RE on one time-frequency resource block may be obtained through estimate interpolation based on one corresponding DMRS port. If the precoder cycling is the RE based precoder cycling, in S340, an equivalent channel matrix corresponding to each RE on one time-frequency resource block may be obtained through estimate interpolation based on corresponding DMRS ports, and there are at least two corresponding DMRS ports on the time-frequency resource block.

Regardless of whether the precoder cycling granularity is a time-frequency resource block or an RE, during demodulation processing, the equivalent channel matrix needs to be estimated based on a DMRS port corresponding to each RE.

For example, if a transmit diversity preprocessing manner is SFTD, and there are two streams, for same time-frequency resource blocks (which correspond to the time-frequency resource block based precoder cycling) having a same precoding vector, or for a same RE pair (which corresponds to the RE level precoder cycling), an equivalent channel matrix estimated based on two DMRSs is as follows:

$$H_{\text{eff}} = \begin{bmatrix} h_{11} & h_{12} \\ h_{22}^* & -h_{21}^* \end{bmatrix}.$$

In this case, estimated values $$\begin{bmatrix} \tilde{s}_1 \\ \tilde{s}_2 \end{bmatrix}$$

of the at least two layer-mapping spatial layers may be simultaneously obtained through demodulation.

Herein, $\tilde{s}$ represents an estimated value of s, h represents an equivalent channel matrix corresponding to a DMRS port, $h_{11}$ represents an equivalent channel vector estimated by using a first DMRS port of a first RE, $h_{12}$ represents an equivalent channel vector estimated by using a second DMRS port of the first RE, $h_{21}$ represents an equivalent channel vector estimated by using a first DMRS port of a second RE, $h_{22}$ represents an equivalent channel vector estimated by using a second DMRS port of the second RE, and $h^*$ represents a conjugate of h.

If equivalent channels of same DMRS ports on two neighboring REs are averaged, a channel difference between REs may be ignored, and the foregoing equivalent channel matrix may be simplified as follows:

$$H_{\mathit{eff}} = \begin{bmatrix} h_1 & h_2 \\ h_2^* & -h_1^* \end{bmatrix},$$

where $h_1$ represents an equivalent channel vector corresponding to a first DMRS port, and $h_2$ represents an equivalent channel vector corresponding to a second DMRS port.

Then the first terminal device performs inverse layer mapping on the estimated value of the at least one layer-mapping spatial layer to obtain the estimated value of the original modulated symbol stream.

Specifically, the first terminal device may perform inverse layer mapping on estimated values of two layer-mapping spatial layers obtained through demodulation, to obtain the estimated value of the original modulated symbol stream. Then the modulated symbol stream is input to a decoder for decoding, to obtain an estimated value of a data bit. If cyclic redundancy check (cyclic redundancy check, CRC) succeeds, it is determined that the estimated value of the data bit is the same as that of an original data bit.

It should be understood that, for a specific data demodulation process, refer to the transmit diversity transmission scheme and the precoder cycling transmission scheme in the prior art. For brevity, detailed descriptions of specific processes are omitted herein. Therefore, transmit diversity preprocessing is performed before precoding, so that at least a spatial diversity gain can be obtained by performing spatial transmit diversity on an original modulated symbol stream. In addition, precoder cycling is performed on a spatial stream obtained after transmit diversity preprocessing, so that different precoding vectors are used for a same transmit diversity spatial stream. When a channel environment changes or a channel is inaccurately estimated, different precoding vectors may be used on different time-frequency resources for channel matching, and at least a time-domain diversity gain or a frequency-domain diversity gain may be obtained. Therefore, this helps obtain transmit diversity gains in a plurality of dimensions, improves received signal quality, and improves data transmission reliability, so that robustness of a communications system can be improved.

Figure 10:
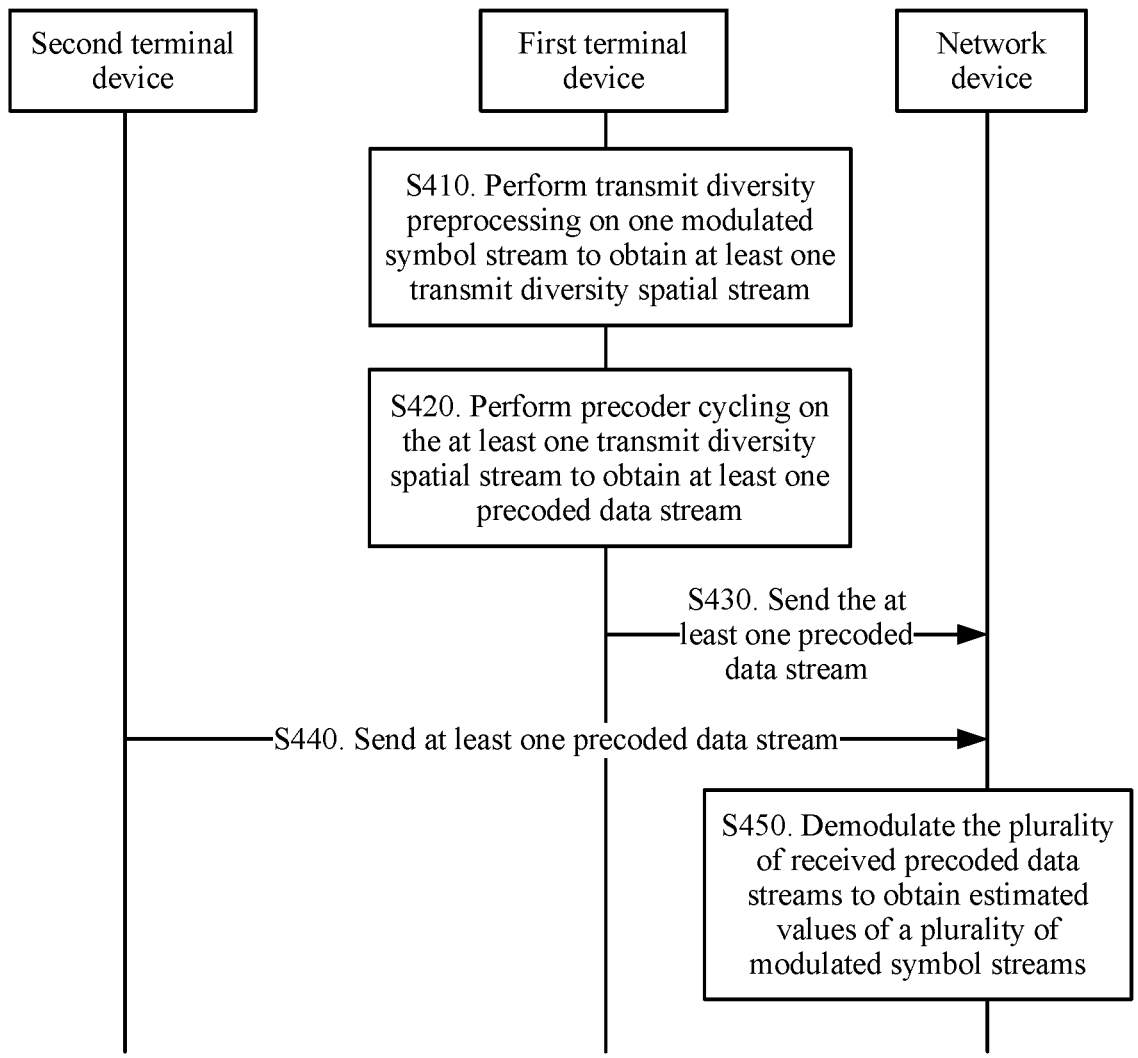
FIG. 10 is a schematic flowchart of a data transmission method according to another embodiment of the present invention.

FIG. 10 is a schematic flowchart of a data transmission method 400 according to another embodiment of the present invention from a perspective of device interaction. Specifically, FIG. 10 shows an uplink data transmission process.

As shown in FIG. 10, the method 400 includes the following operations.

Operation S410. A first terminal device performs transmit diversity preprocessing on one modulated symbol stream to obtain at least one transmit diversity spatial stream.

Operation S420. The first terminal device performs precoder cycling on the at least one transmit diversity spatial stream to obtain at least one precoded data stream.

Operation S430. The first terminal device sends the at least one precoded data stream to a network device.

Operation S440. A second terminal device sends at least one precoded data stream to the network device.

In operations S430 and S440, the network device receives a plurality of precoded data streams sent by the first terminal device and the second terminal device.

Operation S450. The network device demodulates the plurality of precoded data streams to obtain estimated values of a plurality of modulated symbol streams.

It should be understood that a specific process in which the first terminal device sends uplink data to the network device is similar to a specific process in which the network device sends downlink data to the first terminal device. The foregoing describes the specific downlink transmission process in detail with reference to operations S310 to S340. For brevity, detailed descriptions of uplink transmission in operations S410 to S450 are omitted herein.

It should be further understood that the foregoing description with reference to FIG. 10 is merely an example, and should not constitute any limitation on this embodiment of the present invention. For example, the network device may further simultaneously receive precoded data streams sent by more terminal devices. In other words, a plurality of precoded data streams received by the network device may correspond to a plurality of terminal devices including the first terminal device. In one embodiment, the plurality of terminal devices include the second terminal device. In one embodiment, during uplink transmission, the plurality of terminal devices may send, through spatial multiplexing, data to one network device by using a same time-frequency resource, and the plurality of terminal devices may use a same transmission scheme, or may use at least two different transmission schemes.

Therefore, transmit diversity preprocessing is performed before precoding, so that at least a spatial diversity gain can be obtained by performing spatial transmit diversity on an original modulated symbol stream. In addition, precoder cycling is performed on a spatial stream obtained after transmit diversity preprocessing, so that different precoding vectors are used for a same transmit diversity spatial stream. When a channel environment changes or a channel is inaccurately estimated, different precoding vectors may be used on different time-frequency resources for channel matching, and at least a time-domain diversity gain or a frequency-domain diversity gain may be obtained. Therefore, this helps obtain transmit diversity gains in a plurality of dimensions, improves received signal quality, and improves data transmission reliability, so that robustness of a communications system can be improved.

Figure 11:
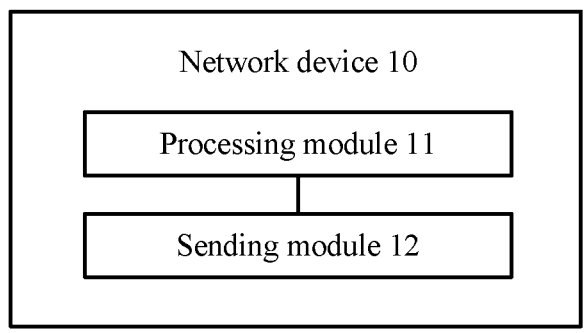
FIG. 11 is a schematic block diagram of a network device according to an embodiment of the present invention.

FIG. 11 is a schematic block diagram of a network device 10 according to an embodiment of the present invention. As shown in FIG. 11, the network device 10 includes a processing module 11 and a sending module 12.

Specifically, the network device 10 may correspond to the network device in the data transmission method 300 according to the embodiment of the present invention. The network device 10 may include modules configured to perform the method performed by the network device in the data transmission method 300 in FIG. 3. In addition, the modules in the network device 10 and the foregoing other operations and/or functions are respectively intended to implement corresponding procedures of the data transmission method 300 in FIG. 3. For brevity, details are not described herein.

Figure 12:
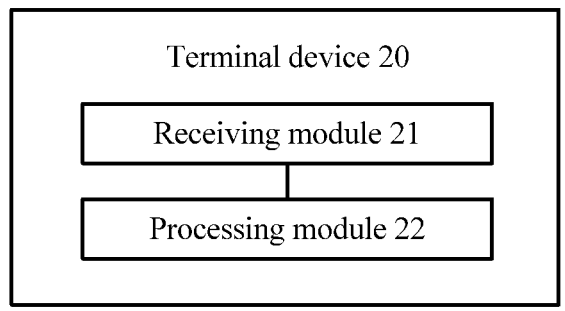
FIG. 12 is a schematic block diagram of a terminal device according to an embodiment of the present invention.

FIG. 12 is a schematic block diagram of a terminal device 20 according to an embodiment of the present invention. As shown in FIG. 12, the terminal device 20 includes a receiving module 21 and a processing module 22.

Specifically, the terminal device 20 may correspond to the first terminal device in the data transmission method 300 according to the embodiment of the present invention. The terminal device 20 may include modules configured to perform the method performed by the first terminal device in the data transmission method 300 in FIG. 3. In addition, the modules in the terminal device 20 and the foregoing other operations and/or functions are respectively intended to implement corresponding procedures of the data transmission method 300 in FIG. 3. For brevity, details are not described herein.

Figure 13:
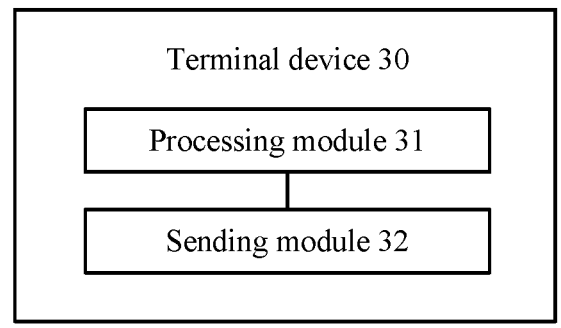
FIG. 13 is a schematic block diagram of a terminal device according to another embodiment of the present invention.

FIG. 13 is a schematic block diagram of a terminal device 30 according to another embodiment of the present invention. As shown in FIG. 13, the terminal device 30 includes a processing module 31 and a sending module 32.

The processing module 31 is configured to: perform transmit diversity preprocessing on one modulated symbol stream to obtain at least one transmit diversity spatial stream; and perform precoder cycling on the at least one transmit diversity spatial stream to obtain at least one precoded data stream, where each of the at least one transmit diversity spatial stream corresponds to at least two different precoding vectors.

The sending module 32 is configured to send the at least one precoded data stream to a network device.

In one embodiment, the processing module 31 is specifically configured to:

perform layer mapping on the modulated symbol stream to obtain at least one layer-mapping spatial layer; and perform a transmit diversity operation on the at least one layer-mapping spatial layer to obtain the at least one transmit diversity spatial stream.

In one embodiment, the precoder cycling includes time-frequency resource block based precoder cycling, each of the at least one transmit diversity spatial stream corresponds to one precoding vector on one time-frequency resource block, and each transmit diversity spatial stream corresponds to different precoding vectors on any two consecutive time-frequency resource blocks.

In one embodiment, the precoder cycling includes resource element (RE) based precoder cycling, and each of the at least one transmit diversity spatial stream corresponds to at least two precoding vectors on one time-frequency resource block.

Specifically, the terminal device 30 may correspond to the first terminal device in the data transmission method 400 according to the embodiment of the present invention. The terminal device 30 may include modules configured to perform the method performed by the first terminal device in the data transmission method 400 in FIG. 10. In addition, the modules in the terminal device 30 and the foregoing other operations and/or functions are respectively intended to implement corresponding procedures of the data transmission method 400 in FIG. 10. For brevity, details are not described herein.

Figure 14:
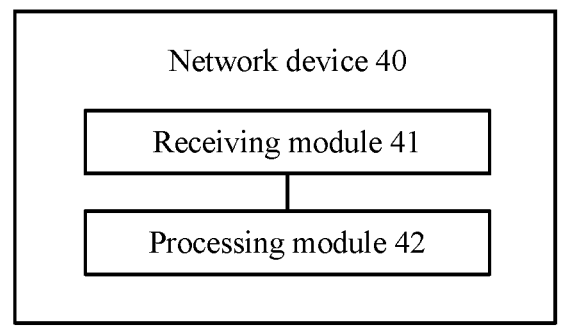
FIG. 14 is a schematic block diagram of a network device according to another embodiment of the present invention.

FIG. 14 is a schematic block diagram of a network device 40 according to another embodiment of the present invention. As shown in FIG. 14, the network device includes a receiving module 41 and a processing module 42.

The receiving module 41 is configured to receive at least one precoded data stream sent by a first terminal device, where the at least one precoded data stream is obtained by the first terminal device by performing precoder cycling on at least one transmit diversity spatial stream, the at least one transmit diversity spatial stream is obtained by performing transmit diversity preprocessing based on one modulated symbol stream, and each of the at least one transmit diversity spatial stream corresponds to at least two different precoding vectors.

The processing module 42 is configured to demodulate the at least one precoded data stream to obtain an estimated value of the modulated symbol stream.

In one embodiment, the processing module 42 is specifically configured to:

obtain an estimated value of at least one layer-mapping spatial layer from the at least one precoded data stream through demodulation, where the estimated value of the at least one layer-mapping spatial layer corresponds to at least one layer-mapping spatial layer obtained by the network device by performing layer mapping on the modulated symbol stream; and perform inverse layer mapping on the estimated value of the at least one layer-mapping spatial layer to obtain the estimated value of the modulated symbol stream.

In one embodiment, the precoder cycling includes time-frequency resource block based precoder cycling, each of the at least one transmit diversity spatial stream corresponds to one precoding vector on one time-frequency resource block, and each transmit diversity spatial stream corresponds to different precoding vectors on any two consecutive time-frequency resource blocks.

In one embodiment, the precoder cycling includes resource element (RE) based precoder cycling, and each of the at least one transmit diversity spatial stream corresponds to at least two precoding vectors on one time-frequency resource block.

In one embodiment, the at least one transmit diversity spatial stream is a spatial stream corresponding to the first terminal device in a plurality of spatial streams, and the plurality of spatial streams correspond to a plurality of terminal devices including the first terminal device.

In one embodiment, transmission schemes for the plurality of spatial streams are the same.

In one embodiment, the plurality of spatial streams belong to at least two transmission schemes.

In one embodiment, the at least two transmission schemes include precoder cycling, transmit diversity, spatial multiplexing, or precoder cycling based transmit diversity.

Specifically, the network device 40 may correspond to the network device in the data transmission method 400 according to the embodiment of the present invention. The network device 40 may include modules configured to perform the method performed by the network device in the data transmission method 400 in FIG. 10. In addition, the modules in the network device 40 and the foregoing other operations and/or functions are respectively intended to implement corresponding procedures of the data transmission method 400 in FIG. 10. For brevity, details are not described herein.

Therefore, transmit diversity preprocessing is performed before precoding, so that at least a spatial diversity gain can be obtained by performing spatial transmit diversity on an original modulated symbol stream. In addition, precoder cycling is performed on a spatial stream obtained after transmit diversity preprocessing, so that different precoding vectors are used for a same transmit diversity spatial stream. When a channel environment changes or a channel is inaccurately estimated, different precoding vectors may be used on different time-frequency resources for channel matching, and at least a time-domain diversity gain or a frequency-domain diversity gain may be obtained. Therefore, this helps obtain transmit diversity gains in a plurality of dimensions, improves received signal quality, and improves data transmission reliability, so that robustness of a communications system can be improved.

Figure 15:
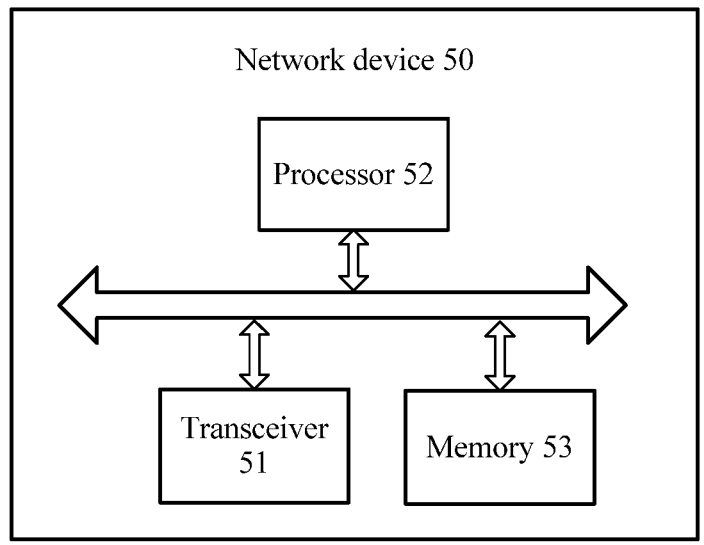
FIG. 15 is another schematic block diagram of a network device according to an embodiment of the present invention.

FIG. 15 is a schematic block diagram of a network device 50 according to an embodiment of the present invention. As shown in FIG. 15, the network device 50 includes a transceiver 51, a processor 52, and a memory 53. The transceiver 51, the processor 52, and the memory 53 communicate with each other by using an internal connection path to transfer a control signal and/or a data signal. The memory 53 is configured to store a computer program, and the processor 52 is configured to invoke the computer program from the memory 53 and run the computer program to control the transceiver 51 to receive and send a signal. The memory 53 may be disposed in the processor 52, or may be independent of the processor 52.

Specifically, the network device 50 may correspond to the network device in the data transmission method 300 according to the embodiment of the present invention. The network device 50 may include units configured to perform the method performed by the network device in the data transmission method 300 in FIG. 3. In addition, the units in the network device 50 and the foregoing other operations and/or functions are respectively intended to implement corresponding procedures of the data transmission method 300 in FIG. 3. For brevity, details are not described herein.

Alternatively, the network device 50 may correspond to the network device in the data transmission method 400 according to the embodiment of the present invention. The network device 50 may include units configured to perform the method performed by the network device in the data transmission method 400 in FIG. 10. In addition, the units in the network device 50 and the foregoing other operations and/or functions are respectively intended to implement corresponding procedures of the data transmission method 400 in FIG. 10. For brevity, details are not described herein.

Figure 16:
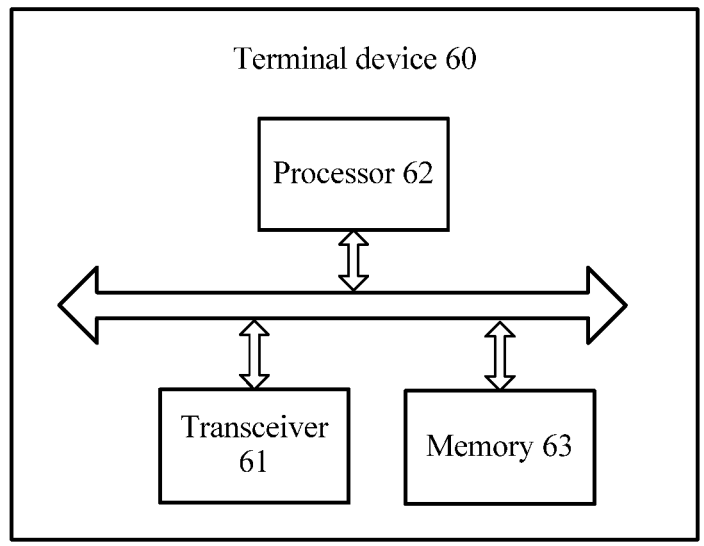
FIG. 16 is another schematic block diagram of a terminal device according to an embodiment of the present invention.

FIG. 16 is a schematic block diagram of a terminal device 60 according to an embodiment of the present invention. As shown in FIG. 16, the terminal device 60 includes a transceiver 61, a processor 62, and a memory 63. The transceiver 61, the processor 62, and the memory 63 communicate with each other by using an internal connection path to transfer a control signal and/or a data signal. The memory 63 is configured to store a computer program, and the processor 62 is configured to invoke the computer program from the memory 63 and run the computer program to control the transceiver 61 to receive and send a signal. The memory 63 may be disposed in the processor 62, or may be independent of the processor 62.

Specifically, the terminal device 60 may correspond to the first terminal device in the data transmission method 300 according to the embodiment of the present invention. The terminal device 60 may include units configured to perform the method performed by the first terminal device in the data transmission method 300 in FIG. 3. In addition, the units in the terminal device 60 and the foregoing other operations and/or functions are respectively intended to implement corresponding procedures of the data transmission method 300 in FIG. 3. For brevity, details are not described herein.

Alternatively, the terminal device 60 may correspond to the first terminal device in the data transmission method 400 according to the embodiment of the present invention. The terminal device 60 may include units configured to perform the method performed by the first terminal device in the data transmission method 400 in FIG. 10. In addition, the units in the terminal device 60 and the foregoing other operations and/or functions are respectively intended to implement corresponding procedures of the data transmission method 400 in FIG. 10. For brevity, details are not described herein.

It should be understood that, in the embodiments of the present invention, the processor may be a central processing unit (CPU); or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like.

It should be further understood that the memory in the embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) serving as an external cache. By way of example but not limitation, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented through software, hardware, firmware, or any combination thereof. When the software is used to implement the embodiments, all or some of the embodiments may be implemented in a form of a computer program product. The computer program product includes one or more computer instructions. When the computer program instructions are loaded or executed on a computer, the procedures or functions according to the embodiments of the present invention are all or partially generated. The computer may be a general-purpose computer, a dedicated computer, a computer network, or another programmable apparatus. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, the units and algorithm operations in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It can be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application should fall within the protection scope of this application. Therefore, the protection scope of this application shall be subject to the protection scope of the claims.

What is claimed is:

1. A data sending method, comprising:
performing, by a network device, transmit diversity preprocessing on one modulated symbol stream to obtain at least one transmit diversity spatial stream;
performing, by the network device, precoder cycling on the at least one transmit diversity spatial stream to obtain at least one precoded data stream, wherein each of the at least one transmit diversity spatial stream corresponds to at least two precoding vectors; and
sending, by the network device, the at least one precoded data stream to a first terminal device.

2. The method according to claim 1, wherein the performing, by a network device, transmit diversity preprocessing on one modulated symbol stream to obtain at least one transmit diversity spatial stream comprises:
performing, by the network device, layer mapping on the modulated symbol stream to obtain at least one layer-mapping spatial layer; and
performing, by the network device, a transmit diversity operation on the at least one layer-mapping spatial layer to obtain the at least one transmit diversity spatial stream.

3. The method according to claim 1, wherein the precoder cycling comprises time-frequency resource block based precoder cycling, wherein each of the at least one transmit diversity spatial stream corresponds to one precoding vector on one time-frequency resource block, and each transmit diversity spatial stream corresponds to different precoding vectors on any two consecutive time-frequency resource blocks.

4. The method according to claim 1, wherein the precoder cycling comprises resource element (RE) based precoder cycling, and each of the at least one transmit diversity spatial stream corresponds to at least two precoding vectors on one time-frequency resource block.

5. The method according to claim 1, wherein the at least one transmit diversity spatial stream is a spatial stream corresponding to the first terminal device in a plurality of spatial streams, and the plurality of spatial streams correspond to a plurality of terminal devices comprising the first terminal device.

6. The method according to claim 5, wherein the plurality of spatial streams belong to at least two transmission schemes.

7. A data receiving method, comprising:
receiving, by a first terminal device, at least one precoded data stream sent by a network device, wherein the at least one precoded data stream is obtained by the network device by performing precoder cycling on at least one transmit diversity spatial stream, the at least one transmit diversity spatial stream is obtained by the network device by performing transmit diversity preprocessing based on one modulated symbol stream, and each of the at least one transmit diversity spatial stream corresponds to at least two different precoding vectors; and
demodulating, by the first terminal device, the at least one precoded data stream to obtain an estimated value of the modulated symbol stream.

8. The method according to claim 7, wherein the demodulating, by the first terminal device, the at least one precoded data stream to obtain an estimated value of the modulated symbol stream comprises:
obtaining, by the first terminal device, an estimated value of at least one layer-mapping spatial layer from the at least one precoded data stream through demodulation, wherein the estimated value of the at least one layer-mapping spatial layer corresponds to at least one layer-mapping spatial layer obtained by the network device by performing layer mapping on the modulated symbol stream; and
performing, by the first terminal device, inverse layer mapping on the estimated value of the at least one layer-mapping spatial layer to obtain the estimated value of the modulated symbol stream.

9. The method according to claim 7, wherein the precoder cycling comprises time-frequency resource block based precoder cycling, wherein each of the at least one transmit diversity spatial stream corresponds to one precoding vector on one time-frequency resource block, and each transmit diversity spatial stream corresponds to different precoding vectors on any two consecutive time-frequency resource blocks.

10. The method according to claim 7, wherein the precoder cycling comprises resource element (RE) based precoder cycling, and each of the at least one transmit diversity spatial stream corresponds to at least two precoding vectors on one time-frequency resource block.

11. A network device, comprising:
a processor, configured to: perform transmit diversity preprocessing on one modulated symbol stream to obtain at least one transmit diversity spatial stream; and perform precoder cycling on the at least one transmit diversity spatial stream to obtain at least one precoded data stream, wherein each of the at least one transmit diversity spatial stream corresponds to at least two different precoding vectors; and
a transceiver, configured to send the at least one precoded data stream to a first terminal device.

12. The network device according to claim 11, wherein the processor is configured to:
perform layer mapping on the modulated symbol stream to obtain at least one layer-mapping spatial layer; and
perform a transmit diversity operation on the at least one layer-mapping spatial layer to obtain the at least one transmit diversity spatial stream.

13. The network device according to claim 11, wherein the precoder cycling comprises time-frequency resource block based precoder cycling, wherein each of the at least one transmit diversity spatial stream corresponds to one precoding vector on one time-frequency resource block, and each transmit diversity spatial stream corresponds to different precoding vectors on any two consecutive time-frequency resource blocks.

14. The network device according to claim 11, wherein the precoder cycling comprises resource element (RE) based precoder cycling, and each of the at least one transmit diversity spatial stream corresponds to at least two precoding vectors on one time-frequency resource block.

15. The network device according to claim 11, wherein the at least one transmit diversity spatial stream is a spatial stream corresponding to the first terminal device in a plurality of spatial streams, and the plurality of spatial streams correspond to a plurality of terminal devices comprising the first terminal device.

16. The network device according to claim 15, wherein the plurality of spatial streams belong to at least two transmission schemes.

17. A terminal device, comprising:
a transceiver, configured to receive at least one precoded data stream sent by a network device, wherein the at least one precoded data stream is obtained by the network device by performing precoder cycling on at least one transmit diversity spatial stream, the at least one transmit diversity spatial stream is obtained by the network device by performing transmit diversity preprocessing based on one modulated symbol stream, and each of the at least one transmit diversity spatial stream corresponds to at least two different precoding vectors; and
a processor, configured to demodulate the at least one precoded data stream to obtain an estimated value of the modulated symbol stream.

18. The terminal device according to claim 17, wherein the processor is configured to:
obtain an estimated value of at least one layer-mapping spatial layer from the at least one precoded data stream through demodulation, wherein the estimated value of the at least one layer-mapping spatial layer corresponds to at least one layer-mapping spatial layer obtained by the network device by performing layer mapping on the modulated symbol stream; and
perform inverse layer mapping on the estimated value of the at least one layer-mapping spatial layer to obtain the estimated value of the modulated symbol stream.

19. The terminal device according to claim 17, wherein the precoder cycling comprises time-frequency resource block based precoder cycling, wherein each of the at least one transmit diversity spatial stream corresponds to one precoding vector on one time-frequency resource block, and each transmit diversity spatial stream corresponds to different precoding vectors on any two consecutive time-frequency resource blocks.

20. The terminal device according to claim 17, wherein the precoder cycling comprises resource element (RE) based precoder cycling, and each of the at least one transmit diversity spatial stream corresponds to at least two precoding vectors on one time-frequency resource block.

* * * * *